United States Patent
Mizuyama et al.

(10) Patent No.: US 7,369,482 B2
(45) Date of Patent: May 6, 2008

(54) OPTICAL PICK-UP ABERRATION CORRECTING MIRROR, ABERRATION CORRECTING METHOD AND OPTICAL PICK-UP

(75) Inventors: Yosuke Mizuyama, Cambridge, MA (US); Shogo Matsubara, Kasuga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 617 days.

(21) Appl. No.: 10/933,501

(22) Filed: Sep. 3, 2004

(65) Prior Publication Data

US 2005/0057826 A1   Mar. 17, 2005

(30) Foreign Application Priority Data

Sep. 4, 2003 (JP) ............ P. 2003-312458
Sep. 18, 2003 (JP) ............ P. 2003-325837

(51) Int. Cl.
*G11B 7/00* (2006.01)

(52) U.S. Cl. ............... 369/112.29; 369/44.23; 369/112.21

(58) Field of Classification Search ............ None
See application file for complete search history.

(56) References Cited

U.S. PATENT DOCUMENTS

| | | | |
|---|---|---|---|
| 6,002,661 A * | 12/1999 | Abe et al. ............ | 369/112.01 |
| 6,108,139 A | 8/2000 | Takahashi | |
| 6,496,466 B1 | 12/2002 | Lee et al. | |
| 6,995,897 B2 * | 2/2006 | Mushika et al. ............ | 359/300 |
| 7,215,476 B2 * | 5/2007 | Kitaoka et al. ............ | 359/641 |
| 7,215,630 B2 * | 5/2007 | Hara et al. ............ | 369/112.29 |
| 2002/0101646 A1 | 8/2002 | Ide et al. | |
| 2004/0183402 A1 | 9/2004 | Mizuyama et al. | |
| 2005/0007906 A1 | 1/2005 | Horinouchi et al. | |

(Continued)

FOREIGN PATENT DOCUMENTS

JP       06120578       4/1994

(Continued)

OTHER PUBLICATIONS

U.S. Appl. No. 10/813,298, 2003.

(Continued)

*Primary Examiner*—William Korzuch
*Assistant Examiner*—Peter Vincent Agustin
(74) *Attorney, Agent, or Firm*—Dickinson Wright, PLLC

(57) ABSTRACT

It is an object of the invention to provide an aberration correcting mirror which has a small size, power saving, a low voltage, a low price and high precision. In particular, it is an object to provide a practical mirror for correcting a spherical aberration.

The invention provides an aberration correcting mirror constituted by a substrate, a piezoelectric unit, a pair of electrode films interposing the piezoelectric unit therebetween, an elastic unit and an optical reflective film, wherein the substrate has a cavity portion which is schematically symmetrical about an optical axis, each of the pair of electrode films is divided into at least two parts including a first electrode and a second electrode, the first electrode being schematically symmetrical about the optical axis and the second electrode being provided to surround the first electrode, and such an electric potential as to set the directions of electric fields in the piezoelectric unit to be reverse to each other is applied to the first electrode and the second electrode.

14 Claims, 33 Drawing Sheets

U.S. PATENT DOCUMENTS

2007/0097836 A1* 5/2007 Kurozuke et al. ..... 369/112.29

FOREIGN PATENT DOCUMENTS

| | | |
|---|---|---|
| JP | 1039122 | 2/1998 |
| JP | 10134400 | 5/1998 |
| JP | 10241201 | 9/1998 |
| JP | 200134993 | 2/2001 |
| JP | 2002279677 | 9/2002 |
| JP | 2002334463 | 11/2002 |
| JP | 200343230 | 2/2003 |
| WO | 02059674 | 8/2002 |

OTHER PUBLICATIONS

International Search Report dated May 19, 2005.

* cited by examiner

POSITION IN RADIAL DIRECTION

POSITION IN RADIAL DIRECTION

E: DIRECTION OF ELECTRIC FIELD

P: DIRECTION OF POLARIZATION

E: DIRECTION OF ELECTRIC FIELD

P: DIRECTION OF POLARIZATION

POSITION IN RADIAL DIRECTION

E: DIRECTION OF ELECTRIC FIELD

P: DIRECTION OF POLARIZATION

OPTICAL PICK-UP ABERRATION CORRECTING MIRROR, ABERRATION CORRECTING METHOD AND OPTICAL PICK-UP

BACKGROUND OF THE INVENTION

1. Field of the Invention

The present invention relates to an optical pick-up of an optical device or an optical disk device, and more particularly to a wave front aberration correcting mirror.

2. Description of the Invention

An information recording medium using an optical disk includes a compact disk (CD) and a digital video disk (DVD). In recent years, there has generally been employed a structure in which a plurality of recording media is read and written by the same optical disk device, and a technique for manufacturing the optical disk device to have a smaller size than that of a conventional device has been required. In particular, an optical disk device for a notebook PC has been increasingly required to reduce a size and a thickness. According to the development of a multimedia technology, moreover, a storage in an optical disk or a demand for a recording capacity tends to be increased year after year, and a recording density is enhanced by such means that (1) a blue laser having a shorter wavelength than that in a conventional art is used or (2) a numerical aperture (NA) of an objective lens is increased. In addition, (3) a recording area is increased by providing a plurality of recording layers in media so that a capacity can be increased.

The optical disk device is provided with a laser beam source, an optical pick-up and a photo-detector. A laser beam emitted from the laser beam source is collected onto the data plane of an optical disk through the optical pickup and is reflected, and is then received by the photo-detector, and information recorded in the optical disk is read or information is written to the optical disk. In this case, the wave front of the beam receives an aberration by various optical components or optical disks. For this reason, an aberration correction is indispensable for correctly reading and writing information. Referring to a dynamic aberration generated during the rotation of the optical disk or the different read of various layers, particularly, fixed correcting means formed by a lens or a diffracting optical unit constituting the optical pick-up is improper and a dynamic correction to be carried out by an actuator is indispensable.

The conventionally proposed aberration correcting means will be schematically described below with reference to the prior document.

In a method described in (JP-A-10-241201 Publication), a spherical aberration is corrected by moving a correcting lens by means of an actuator. However, this method is unstable for an optical pick-up in which an actuator portion is large, an excessive lens is required and a demand for a reduction in a size such as PC uses is great.

In a method described in (JP-A-10-134400 Publication), there has been disclosed a method of correcting a spherical aberration by moving one of collimator lenses through an actuator. Similarly, there is a problem in that the method is unstable for an optical pick-up in which an actuator portion is large and an excessive lens is required, and a demand for a reduction in a size such as PC uses is great.

An aberration correcting mirror described in (JP-A-10-039122 Publication) has such a structure as to bond a flange using a soft material to a mirror having a spherical initial shape and to stick a piezoelectric device to the back face of the flange, and serves to change the curvature of the mirror by the deformation of the piezoelectric device. In this method, however, there is a problem in that it is hard to inexpensively fabricate a small mirror with high precision and the mirror is deformed when bonding the flange or the piezoelectric device. Even if the bonding is carried out with high precision, moreover, there is also a problem in that the amount of the deformation of the piezoelectric device is remarkably small and the amount of the deformation which is required for an aberration correction cannot be obtained with an electrode to be a solid electrode which has been proposed and the structure of the piezoelectric device having surroundings fixed completely, and within the range of the practical magnitude of a voltage. Even if the deformation is carried out, furthermore, there is a problem in that it is hard to have an optional spherical shape through the deformation. The practical magnitude of the voltage indicates a smaller voltage than the upper limit of a voltage based on an insulating property or a polarization efficiency. In addition, the piezoelectric device of a bulk is used. For this reason, there is a problem in that a comparatively high voltage, for example, approximately 50 V is required for a driving voltage.

In a method described in (JP-A-2001-34993 Publication), there has been disclosed a method of applying a voltage with a structure in which a pair of opposed sides is fixed and the other pair of sides is free, thereby deforming the piezoelectric device to decrease a coma in a rectangle piezoelectric device. In this method, however, the piezoelectric device basically takes the shape of a wedge. For this reason, there is a problem in that a spherical aberration cannot be corrected even if a plurality of electrodes is combined with each other.

In a method described in (JP-A-2002-279677 Publication), there has been described an example in which an electrode taking such a shape as to correspond to a coma is formed on a piezoelectric device and the piezoelectric device is deformed by applying a voltage, thereby relieving the coma. Also in this method, however, a displacement is very small actually and such a displacement as to meet the aberration correction cannot be obtained within a range of the practical magnitude of a voltage if the surroundings of the piezoelectric device are fixed. Particularly, there is a problem in that this method is not suitable for an optical pick-up drive using an objective lens having a high NA.

As described above, there has been proposed that the wave front aberration of a beam is corrected by a method of mechanically moving the position of a lens in a conventional example (JP-A-10-241201 Publication and JP-A-10-134400 Publication) or mechanically deforming a mirror (JP-A-10-039122 Publication, JP-A-2001-34993 Publication, and JP-A-2002-279677 Publication) In the former example, there is a problem in that a driving device for changing the position of the lens is large and a demand for reducing a size is not satisfied. On the other hand, in the latter example, there is a problem in that the demand for reducing a size is satisfied and the amount of a deformation is small because the piezoelectric device is used. In order to explain this problem, the basic action of the piezoelectric device will be described with reference to FIG. 18. A piezoelectric unit is an electromechanical energy converting unit, and generates a mechanical stress to cause an elastic deformation when an electric field is applied. When an elastic unit is bonded to the piezoelectric unit, a whole material is deformed corresponding to the physical properties (elasticity) of each material by the action of the piezoelectric unit. FIG. 18 is a perspective view showing the state of the deformation of a piezoelectric unit before and after applying a voltage. It is assumed that a piezoelectric unit 1 obtained before the application of an electric field is a rectangular parallelepiped and is arranged with respect to an orthogonal coordinate system as shown in FIG. 18. Moreover, it is assumed that the piezoelectric unit 1 is previously subjected to a polarizing process in a +z direction. At this time, it is assumed that the piezoelectric distortion constant of the piezoelectric unit 1 is represented by a matrix expressed in a so-called d format (Equation 1), for example.

$$d = \begin{bmatrix} 0 & 0 & -0.1360 \\ 0 & 0 & 0.1360 \\ 0 & 0 & 0.3370 \\ 0 & 0.5 & 0 \\ 0.5 & 0 & 0 \\ 0 & 0 & 0 \end{bmatrix} \times 10^{-9} \ (C/N) \quad \text{[Equation 1]}$$

At this time, a distortion S based on an electric field E is expressed in a tensor form:

$$S_i = d_{ij} E_j$$

Herein, an index takes i=1, 2, 3, 4, 5, 6 and j=1, 2, 3. As shown in FIG. 18, only $E_3$ is non-zero when an electric field is set into the +z direction. Therefore, only $S_1$, $S_2$ and $S_3$ are non-zero based on the (Equation 1). In addition, only $S_1$ is negative and $S_2$ and $S_3$ are positive. In accordance with the custom of a marking method related to a piezoelectric device, it is apparent that $S_1=S_{xx}$, $S_2=S_{yy}$, and $S_3=S_{zz}$ are set and only $S_{xx}$ has a negative sign, and a contraction is thus carried out in an x direction and an expansion is performed in y and z directions. Referring to a piezoelectric unit 2 in FIG. 18, there is schematically shown the form of a deformation obtained by the expansion and contraction after the application of an electric field.

FIG. 19 is a sectional view showing a unimolf type piezoelectric device in which a piezoelectric unit 3 and an elastic unit 4 are bonded to each other. In the same manner as described above, it is assumed that the piezoelectric unit 3 should be polarized in the +z direction. The elastic unit 4 is bonded to the lower part of the piezoelectric unit 3. A displacement on an end face at a left side in the drawings is completely constrained and the other end is caused to be free. FIGS. 19(a) and (b) show states obtained before and after the application of an electric field, respectively. When the electric field is applied in the +z direction, the piezoelectric unit 3 tries to be contracted in the x direction in the same manner as the above description. Since a left end is fixed, however, the elastic unit 4 is downward convexed upon receipt of a bending moment. As a result, the elastic unit 4 is warped up in the +z direction. A whole displacement is determined by the elastic constants of the piezoelectric unit and the elastic unit and the thickness of a film in addition to the piezoelectric distortion constant To the contrary, when the electric field is applied in a −z direction, the piezoelectric unit 3 tends to be extended in the x direction so that the elastic unit 4 receives a bending moment having a reverse polarity, and is thus convexed upward and is warped in the −z direction (not shown).

Next, description will be given to the case in which a displacement is constrained on both ends of a piezoelectric device. FIG. 20 is a sectional view showing a unimolf type piezoelectric device in which the piezoelectric unit 3 and the elastic unit 4 are bonded to each other. In the case in which both ends are completely fixed differently from the case in which only one end is fixed, a bending moment is generated with difficulty so that a displacement is remarkably reduced as shown in FIG. 20. An electric field strength to be applied to the piezoelectric unit has a practical upper limit due to a limit such as a dielectric breakdown. For this reason, a deformation rarely appears within a range of the electric field strength. Even if a very small displacement is obtained, the amount of an aberration to be corrected is larger than that in the conventional art and the amount of the displacement of the shape of a mirror required for the correction is several to several tens times as large as the wavelength of a light to be used in case of an optical system using an objective lens having a high NA and an optical system having a short wavelength. In the structure shown in FIG. 20, therefore, it is impossible to obtain such a great displacement. In order to correct a spherical aberration, it is necessary to first cause the shape of the mirror to be circular and to secondly deform the mirror to be spherical. In order to carry out the deformation into a spherical surface, a symmetry about the optical axis of the shape of the mirror is very important. Accordingly, it is necessary to completely fix the circumference of the mirror in order to dynamically hold a circular mirror axially symmetrically. From the above description, it is apparent that the displacement of a piezoelectric device mirror having a circumference fixed completely is remarkably small. In the method according to the conventional art, accordingly, it is hard to achieve the aberration correction by the piezoelectric device.

SUMMARY OF THE INVENTION

It is an object of the invention to provide an aberration correcting mirror having a small size, power saving, a low voltage, a low price and high precision. In particular, it is an object to provide a practical mirror which corrects a spherical aberration.

Therefore, the invention provides an aberration correcting mirror constituted by a substrate, a piezoelectric unit, a pair of electrode films interposing the piezoelectric unit therebetween, an elastic unit and an optical reflective film, wherein the substrate has a cavity portion which is schematically symmetrical about an optical axis, each of the pair of electrode films is divided into at least two parts having a first electrode and a second electrode, the first electrode being schematically symmetrical about the optical axis and the second electrode being provided to surround the first electrode, and electric potentials in directions of electric fields in the piezoelectric unit which are reverse to each other are applied to the first electrode and the second electrode. In the aberration correcting mirror, the electrode is circular. Therefore, the shape of the mirror becomes spherical in case of a deformation, which is optimum for correcting a spherical aberration. Moreover, an inflection point is generated in an electrode dividing position. Consequently, it is possible to produce an advantage that a great displacement of approximately several microns at a low voltage can be obtained. Furthermore, it is possible to obtain an advantage that the spherical aberration can be corrected at all angles of incidence including the case in which the angle of a beam incident on the mirror is vertical (in this case, the shape of the mirror is circular) by setting the shape of the mirror to be elliptical.

The invention provides an aberration correcting mirror constituted by a substrate, a piezoelectric unit, a pair of electrode films interposing the piezoelectric unit therebetween, an elastic unit and an optical reflective film, wherein the substrate has a cavity portion which is schematically symmetrical about an optical axis, each of the pair of electrode films is divided into at least two parts having a first electrode and a second electrode, the first electrode being schematically symmetrical about the optical axis and the second electrode being provided to surround the first electrode, and a polarization processing is carried out in such a manner that directions of a polarization are opposite to each other in the first and second electrode portions in the piezoelectric unit. In the aberration correcting mirror, the electrode is circular. Therefore, the shape of the mirror becomes spherical in case of a deformation, which is optimum for correcting a spherical aberration. Moreover, an inflection point is generated in an electrode dividing position. Consequently, it is possible to produce an advantage that a great displacement of approximately several microns at a low voltage can be obtained. Furthermore, it is possible to obtain an advantage that the spherical aberration can be corrected at all angles of incidence including the case in which the angle of a beam incident on the mirror is vertical (in this case, the shape of the mirror is circular) by setting the shape of the mirror to be elliptical.

DESCRIPTION OF THE PREFERRED EMBODIMENTS

Figure 1:
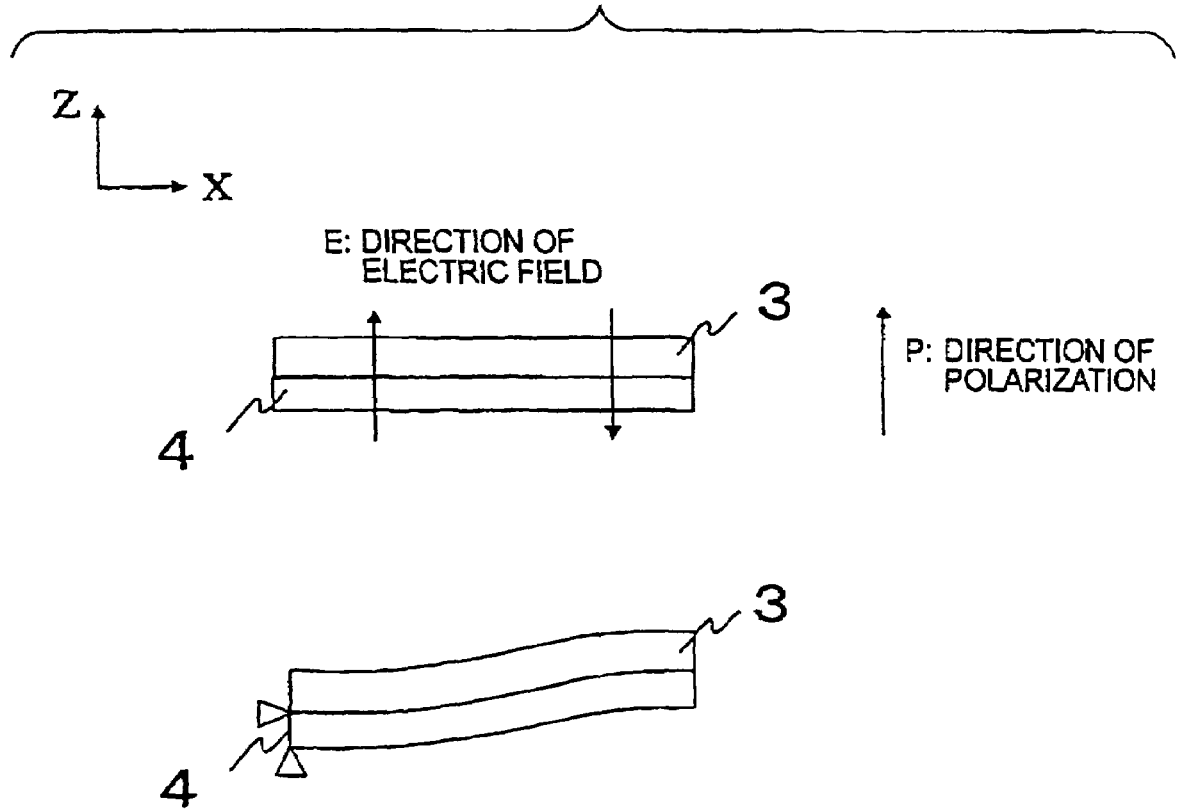
FIG. 1 is a view showing the operation principle of an aberration correcting mirror according to the invention.

A first aspect of the invention is directed to an optical pick-up aberration correcting mirror comprising a substrate having a cavity portion, a piezoelectric unit provided opposite to the cavity portion, a pair of electrode films interposing the piezoelectric unit therebetween, an elastic unit provided opposite to the cavity portion, and an optical reflective film provided opposite to the cavity portion, wherein each of the pair of electrode films is divided into at least two parts having a first electrode and a second electrode, the second electrode being provided to surround the first electrode, and such an electric potential as to set directions of electric fields in the piezoelectric unit to be reverse to each other is applied between the first electrode and the second electrode. The optical reflective film can be deformed with high precision. Therefore, it is possible to particularly reduce a spherical aberration.

A second aspect of the invention is directed to the optical pick-up aberration correcting mirror according to the first aspect of the invention, wherein the cavity portion takes a circular shape. In general, a beam which is incident has a circular section. Therefore, an aberration can be corrected over almost the whole beam.

A third aspect of the invention is directed to the optical pick-up aberration correcting mirror according to the first aspect of the invention, wherein the first electrode takes a circular shape. In general, a beam which is incident has a circular section. Therefore, an aberration can be corrected over almost the whole beam.

A fourth aspect of the invention is directed to the optical pick-up aberration correcting mirror according to the first aspect of the invention, wherein the cavity portion and the first electrode are concentric with each other. An aberration can be corrected reliably.

A fifth aspect of the invention is directed to the optical pick-up aberration correcting mirror according to the first aspect of the invention, wherein a ratio r/R of an outside diameter r of the first electrode to an outside diameter R of the second electrode is equal to or higher than 0.7 and is lower than 1. A reflective film can be deformed efficiently and the amount of fetches of a device in a manufacture can also be increased. Therefore, the invention is also advantageous to a cost.

A sixth aspect of the invention is directed to the optical pick-up aberration correcting mirror according to the first aspect of the invention, wherein an initial shape of a mirror is schematically planar. The initial condition of the reflective film can be specified. Therefore, it is possible to implement an operation with high precision.

A seventh aspect of the invention is directed to the optical pick-up aberration correcting mirror according to the first aspect of the invention, wherein a lead wire from the first electrode is symmetrical about an axis of the first electrode. The reflective film can be deformed with high precision.

An eighth aspect of the invention is directed to the optical pick-up aberration correcting mirror according to the first aspect of the invention, wherein the piezoelectric unit is a thin film. Driving can also be carried out at a comparatively low voltage. Consequently, power saving can be realized.

A ninth aspect of the invention is directed to the optical pickup aberration correcting mirror according to the first aspect of the invention, wherein a portion corresponding to the first electrode or an inside thereof is utilized as a mirror in the reflective film. Consequently, an aberration can be reduced reliably.

A tenth aspect of the invention is directed to the optical pick-up aberration correcting mirror according to the first aspect of the invention, wherein the cavity portion is schematically symmetrical about an optical axis. An aberration can be reduced reliably.

A eleventh aspect of the invention is directed to the optical pick-up aberration correcting mirror according to the first aspect of the invention, wherein the first electrode is schematically symmetrical about an optical axis. An aberration can be reduced reliably.

A twelfth aspect of the invention is directed to an optical pick-up aberration correcting method, wherein there are provided a light source, an optical system for leading a light emitted from the light source to a medium, and a light receiver for leading at least one of a reflected light from the medium and the light emitted from the light source and converting a light signal into an electric signal, the optical pick-up aberration correcting mirror according to any of the first to eleventh aspects of the invention is provided in the optical system, and the optical pick-up aberration correcting mirror is driven based on an output from the light receiver to reduce an aberration. It is possible to implement an operation for reducing an aberration on a timely basis. Consequently, an optical characteristic can be enhanced.

A thirteenth aspect of the invention is directed to the optical pick-up aberration correcting method according to the twelfth aspect of the invention, wherein a ratio r/R of an outside diameter r of the first electrode to an outside diameter R of the second electrode is equal to or higher than 0.7 and is lower than 1. A reflective film can be deformed efficiently and the amount of fetches of a device in a manufacture can also be increased. Therefore, the invention is also advantageous to a cost.

A fourteenth aspect of the invention is directed to an optical pick-up, wherein there are provided a light source, an optical system for leading a light emitted from the light source to a medium, and a light receiver for leading at least one of a reflected light from the medium and the light emitted from the light source and converting a light signal into an electric signal, and the optical pickup aberration correcting mirror according to any of the first to eleventh aspects of the invention is provided in the optical system. It is possible to implement an operation for reducing an aberration on a timely basis. Consequently, an optical characteristic can be enhanced.

A fifteenth aspect of the invention is directed to an aberration correcting mirror for an optical device comprising a substrate having a cavity portion, a piezoelectric unit provided opposite to the cavity portion, a pair of electrode films interposing the piezoelectric unit therebetween, an elastic unit provided opposite to the cavity portion, and an optical reflective film provided opposite to the cavity portion, wherein each of the pair of electrode films is divided into at least two parts having a first electrode and a second electrode, the second electrode being provided to surround the first electrode, and such an electric potential as to set directions of electric fields in the piezoelectric unit to be reverse to each other is applied between the first electrode and the second electrode. The optical reflective film can be deformed with high precision. Therefore, it is possible to particularly reduce a spherical aberration.

A sixteenth aspect of the invention is directed to an optical pick-up aberration correcting mirror comprising a substrate having a cavity portion, a piezoelectric unit provided opposite to the cavity portion, a pair of electrode films interposing the piezoelectric unit therebetween, an elastic unit provided opposite to the cavity portion, and an optical reflective film provided opposite to the cavity portion, wherein each of the pair of electrode films is divided into at least two parts having a first electrode and a second electrode, the second electrode being provided to surround the first electrode, and a polarization processing is carried out in different directions from each other between the first electrode and the second electrode. The optical reflective film can be deformed with high precision. Therefore, it is possible to particularly reduce a spherical aberration.

A seventeenth aspect of the invention is directed to the optical pick-up aberration correcting mirror according to the first aspect of the invention, wherein the cavity portion takes a circular shape. In general, a beam which is incident has a circular section. Therefore, an aberration can be corrected over almost the whole beam.

An eighteenth aspect of the invention is directed to the optical pick-up aberration correcting mirror according to the first aspect of the invention, wherein the first electrode takes a circular shape. In general, a beam which is incident has a circular section. Therefore, an aberration can be corrected over almost the whole beam.

A nineteenth aspect of the invention is directed to the optical pick-up aberration correcting mirror according to the first aspect of the invention, wherein the cavity portion and the first electrode are concentric with each other. An aberration can be corrected reliably.

A twentieth aspect of the invention is directed to the optical pick-up aberration correcting mirror according to the first aspect of the invention, wherein a ratio r/R of an outside diameter r of the first electrode to an outside diameter R of the second electrode is equal to or higher than 0.7 and is lower than 1. A reflective film can be deformed efficiently and the amount of fetches of a device in a manufacture can also be increased. Therefore, the invention is also advantageous to a cost.

A twenty-first aspect of the invention is directed to the optical pick-up aberration correcting mirror according to the first aspect of the invention, wherein an initial shape of a mirror is schematically planar. The initial condition of the reflective film can be specified. Therefore, it is possible to implement an operation with high precision.

A twenty-second aspect of the invention is directed to the optical pickup aberration correcting mirror according to the first aspect of the invention, wherein a lead wire from the first electrode is symmetrical about an axis of the first electrode. The reflective film can be deformed with high precision.

A twenty-third aspect of the invention is directed to the optical pick-up aberration correcting mirror according to the first aspect of the invention, wherein the piezoelectric unit is a thin film. Driving can also be carried out at a comparatively low voltage. Consequently, power saving can be realized.

A twenty-fourth aspect of the invention is directed to the optical pick-up aberration correcting mirror according to the first aspect of the invention, wherein a portion corresponding to the first electrode or an inside thereof is utilized as a mirror in the reflective film. Consequently, an aberration can be reduced reliably.

A twenty-fifth aspect of the invention is directed to the optical pick-up aberration correcting mirror according to the first aspect of the invention, wherein the cavity portion is schematically symmetrical about an optical axis. An aberration can be reduced reliably.

A twenty-sixth aspect of the invention is directed to the optical pick-up aberration correcting mirror according to the first aspect of the invention, wherein the first electrode is schematically symmetrical about an optical axis. An aberration can be reduced reliably.

A twenty-seventh aspect of the invention is directed to an optical pick-up aberration correcting method, wherein there are provided a light source, an optical system for leading a light emitted from the light source to a medium, and a light receiver for leading at least one of a reflected light from the medium and the light emitted from the light source and converting a light signal into an electric signal, the optical pick-up aberration correcting mirror according to any of the first to eleventh aspects of the invention is provided in the optical system, and the optical pick-up aberration correcting mirror is driven based on an output from the light receiver to reduce an aberration. It is possible to implement an operation for reducing an aberration on a timely basis. Consequently, an optical characteristic can be enhanced.

A twenty-eighth aspect of the invention is directed to the optical pick-up aberration correcting method according to the twelfth aspect of the invention, wherein a ratio r/R of an outside diameter r of the first electrode to an outside diameter R of the second electrode is equal to or higher than 0.7 and is lower than 1. A reflective film can be deformed efficiently and the amount of fetches of a device in a manufacture can also be increased. Therefore, the invention is also advantageous to a cost.

A twenty-ninth aspect of the invention is directed to an optical pick-up, wherein there are provided a light source, an optical system for leading a light emitted from the light source to a medium, and a light receiver for leading at least one of a reflected light from the medium and the light emitted from the light source and converting a light signal into an electric signal, and the optical pickup aberration correcting mirror according to any of the first to eleventh aspects of the invention is provided in the optical system. It is possible to implement an operation for reducing an aberration on a timely basis. Consequently, an optical characteristic can be enhanced.

A thirtieth aspect of the invention is directed to an aberration correcting mirror for an optical device comprising a substrate having a cavity portion, a piezoelectric unit provided opposite to the cavity portion, a pair of electrode films interposing the piezoelectric unit therebetween, an elastic unit provided opposite to the cavity portion, and an optical reflective film provided opposite to the cavity portion, wherein each of the pair of electrode films is divided into at least two parts having a first electrode and a second electrode, the second electrode being provided to surround the first electrode, and such an electric potential as to set directions of electric fields in the piezoelectric unit to be reverse to each other is applied between the first electrode and the second electrode. The optical reflective film can be deformed with high precision. Therefore, it is possible to particularly reduce a spherical aberration.

First Embodiment

Figure 2:
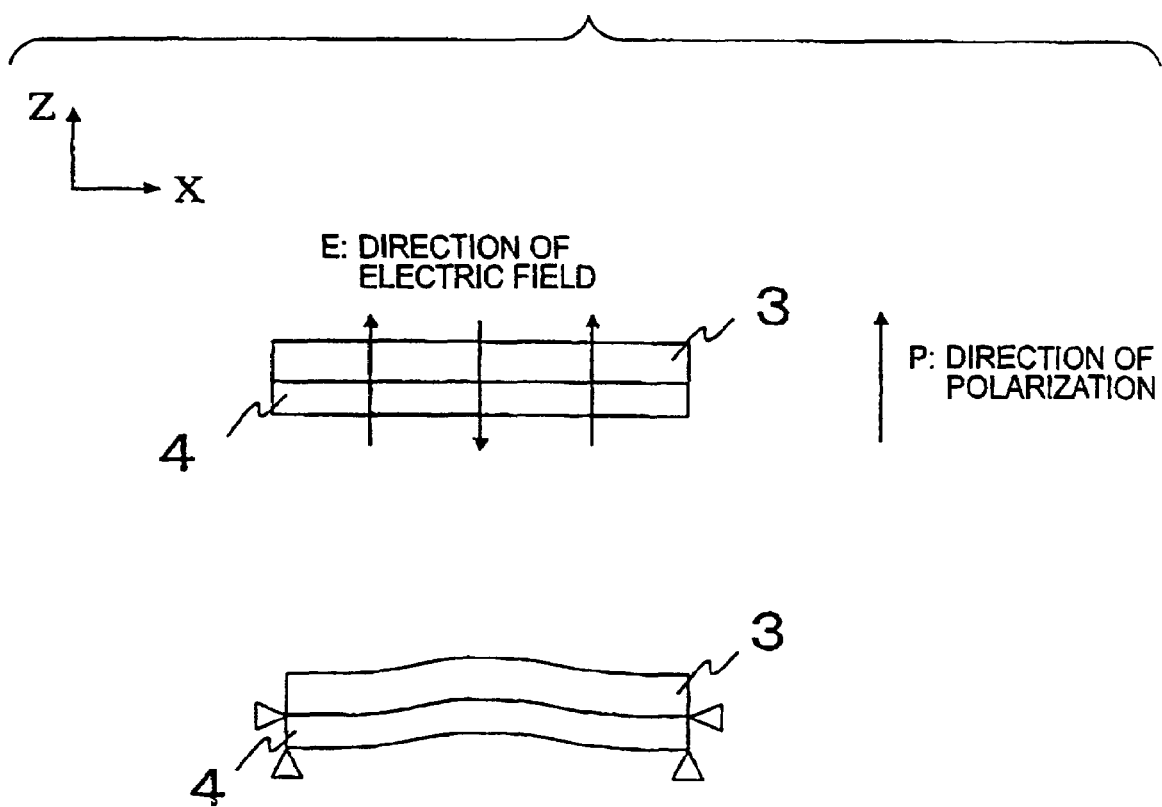
FIG. 2 is a view showing the operation principle of the aberration correcting mirror according to the invention.
Figure 3:
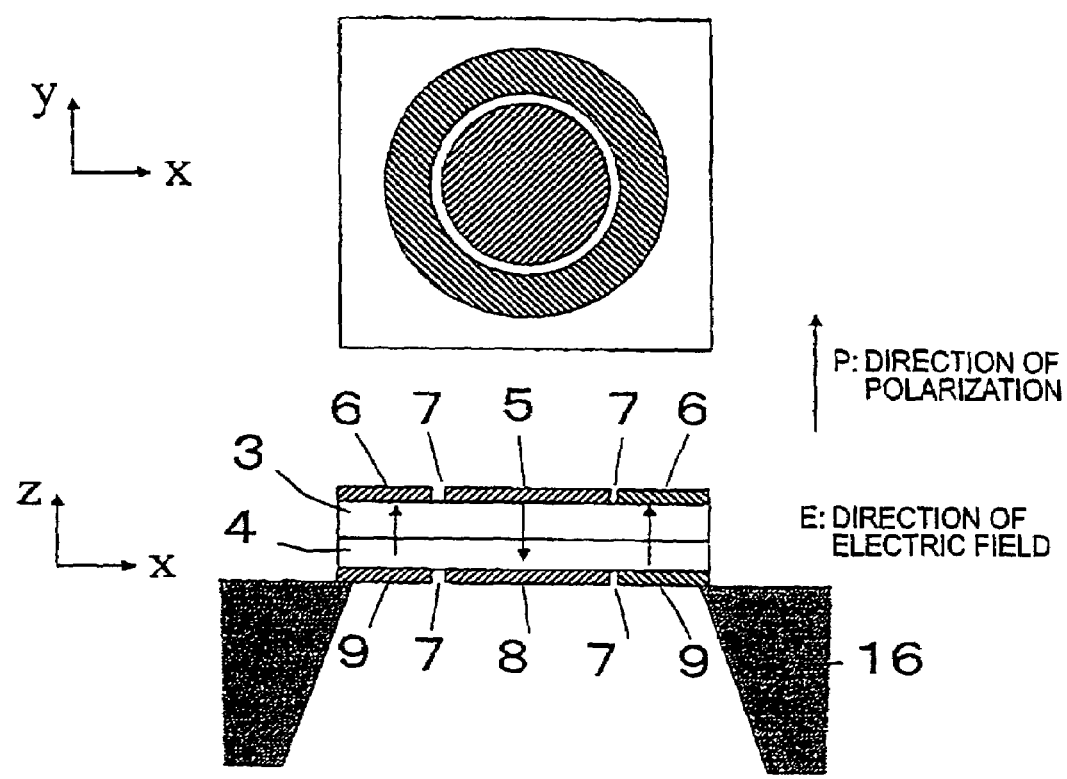
FIG. 3 is a view typically showing the aberration correcting mirror according to the invention.

A basic structure according to an embodiment of the invention will be described below with reference to FIGS. 1, 2 and 3. FIG. 1 is a typical sectional view showing a unimolf type piezoelectric device taking the shape of a beam in which a piezoelectric unit 3 and an elastic unit 4 are bonded to each other. The piezoelectric unit 3 is polarized in a +z direction. As compared with the conventional art, an electric field is not applied in one direction but the +z direction in a region on a left side and a −z direction in a region on a right side in the drawing according to the invention. In this case, it can be understood from the above description that the region on the left side in the drawing is downward convexed and the region on the right side in the drawing is upward convexed. Accordingly, an inflection point is generated in the vicinity of a boundary between both of the regions. By utilizing the fact, when an electric field distribution inverted alternately is applied as shown in FIG. 2, a bending moment is generated to take an upward convex shape in a central part and a downward convex shape at both ends so that the inflection point is formed in two places. Also in the case in which both ends are constrained, therefore, a great displacement can be obtained. By using the same method, any number of inflection points can be formed. Consequently, it is possible to fabricate a mirror taking such a shape as to have a practical displacement amount and to correspond to various aberrations. FIG. 3 is a typical view showing one configuration for implementing the same advantages circularly, and a plan view and a sectional view taken along a center. The piezoelectric unit 3 has an upper electrode formed in an upper part and a lower electrode formed in a lower part. The upper electrode is divided into a first upper electrode 5 and a second upper electrode 6 through an insulating portion 7. Similarly, the lower electrode is also divided into a first lower electrode 8 and a second lower electrode 9 through the insulating portion 7. By this structure, it is possible to apply electric fields having different polarities from each other in the respective first and lower electrode regions in the upper electrode and the lower electrode. Thus, it is possible to produce an advantage that a great displacement can be obtained as described above. While the insulating portion 7 is constituted with a spatial gap provided thereon in the embodiment, moreover, it is also possible to constitute the insulating portion 7 by burying an insulating material such as silicon dioxide or alumina in the gap. In the case in which the first electrode and the second electrode will be expressed as follows, the first electrode indicates at least one of the first upper electrode 5 and the first lower electrode 8, and the second electrode indicates at least one of the second upper electrode 6 and the second lower electrode 9.

Figure 16:
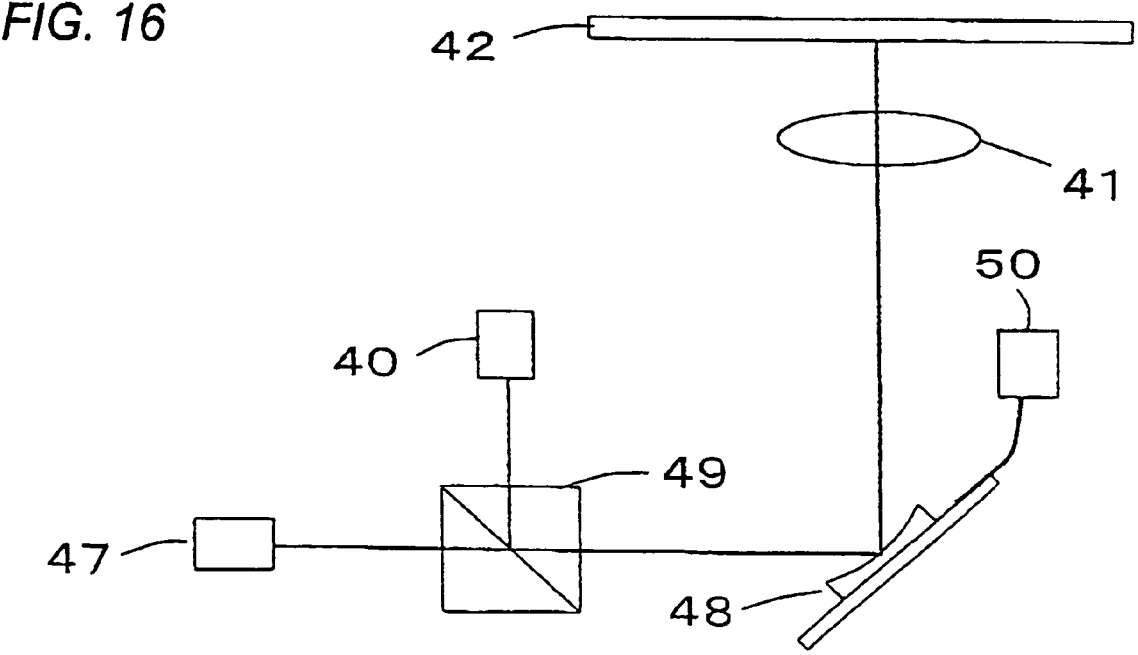
FIG. 16 is a view showing the optical path of an optical pick-up according to the invention.

FIG. 16 shows an example of the basic structure of an optical pick-up. A beam emitted from a light source 47 for emitting a laser beam is transmitted through a beam splitter 49 and is reflected by an aberration correcting mirror 48 serving as a rising mirror, and passes through an objective lens 41 so that an image is formed on an optical disk 42. The light reflected therein is reflected by the aberration correcting mirror 48 and is then reflected by the beam splitter 49, and is converted into an electric signal in a photo-detector 40. By this structure, the beam is incident on the aberration correcting mirror 48 at 45 degrees. A control voltage is supplied from a driver 50 to the aberration correcting mirror 48. The driver 50 can determine the value of the control voltage and can change the curvature of the aberration correcting mirror based on a signal sent from at least one of a light receiver such as a photodetector for a monitor (not shown) which serves to detect the amount of a spherical aberration and the photo-detector 40. In the case in which the light emitted from the light source 47 has a color from blue to violet and a short wavelength, the structure is particularly useful.

Figure 17:
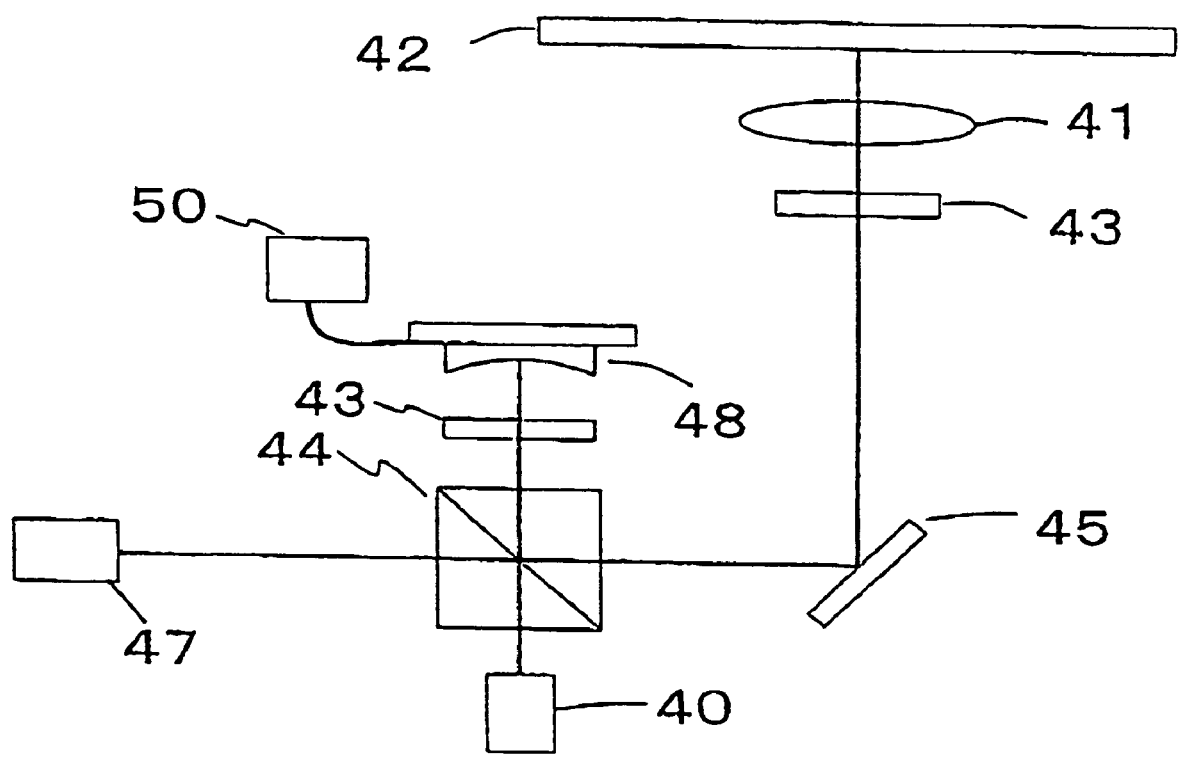
FIG. 17 is a view showing the optical path of an optical pick-up according to a further configuration of the invention.
Figure 18:
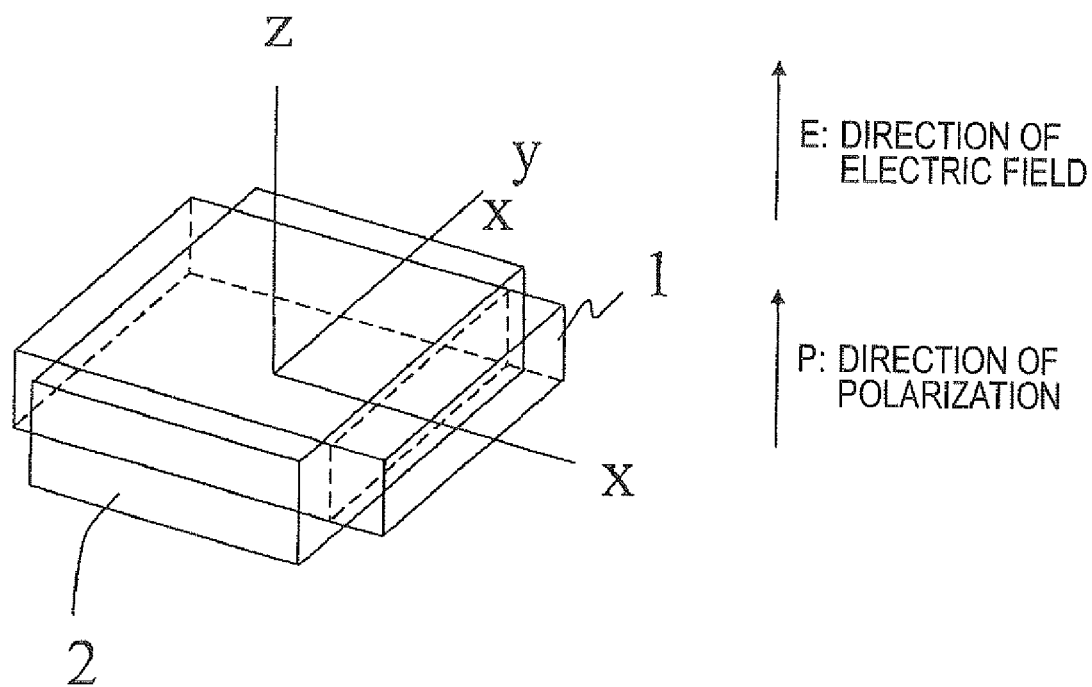
FIG. 18 is a perspective view showing the operation of a piezoelectric device.
Figure 19:
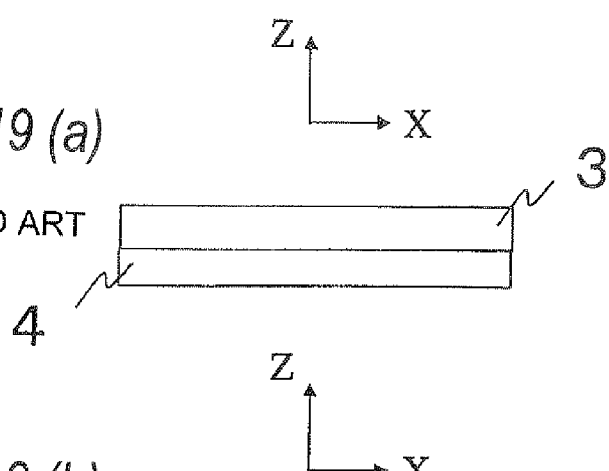
FIG. 19 is a sectional view showing the operation of the piezoelectric device.
Figure 19:
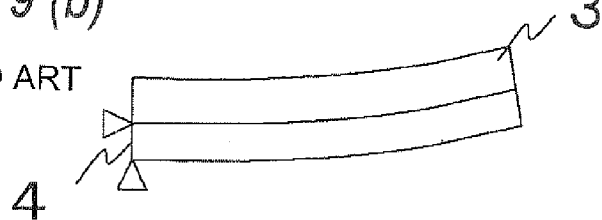
Figure 20:
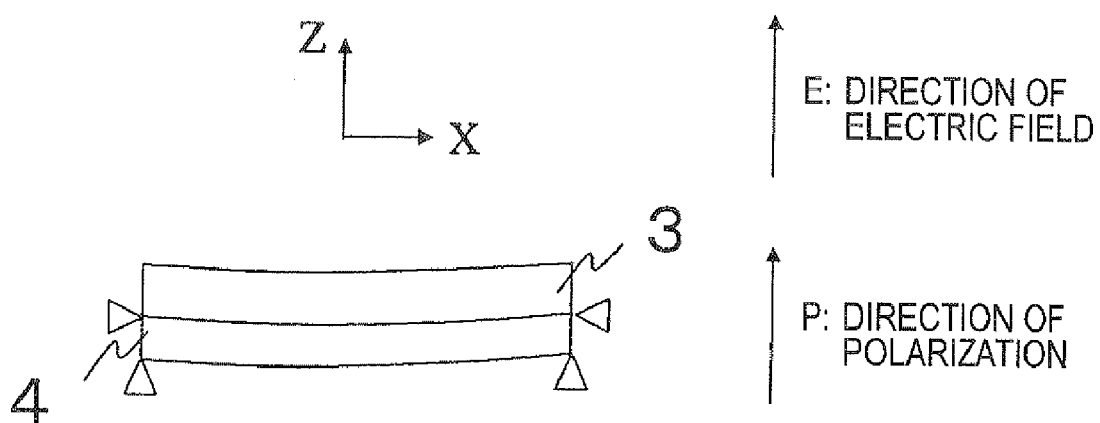
FIG. 20 is a sectional view showing a piezoelectric device, illustrating the operation of a conventional aberration correcting mirror.

FIG. 17 shows the structure of an optical pick-up according to another configuration. A beam emitted from a light source 47 is transmitted through a polarizing beam splitter 44 and is reflected by a rising mirror 45, and passes through a ¼ wavelength plate 43 and an objective lens 41 and is collected onto a disk 42. Then, the light reflected by the optical disk 42 changes a polarizing state at 90 degrees, and passes through the rising mirror 45, is reflected by the polarizing beam splitter 44 and is transmitted through another ¼ wavelength plate 43, and is reflected by an aberration correcting mirror 48 and is transmitted through the ¼ wavelength plate 43 again to change the polarizing state at 90 degrees, and is then transmitted through the polarizing beam splitter 44 and is converted into an electric signal in a photodetector 40. A control voltage is supplied from a driver 50 to the aberration correcting mirror 48. The driver 50 can determine the value of the control voltage and can change the curvature of the aberration correcting mirror based on a signal sent from at least one of a light receiver such as a photo-detector for a monitor (not shown) which serves to detect the amount of a spherical aberration and the photo-detector 40. In the case in which the light emitted from the light source 47 has a color from blue to violet and a short wavelength, the structure is particularly useful.

Figure 4:
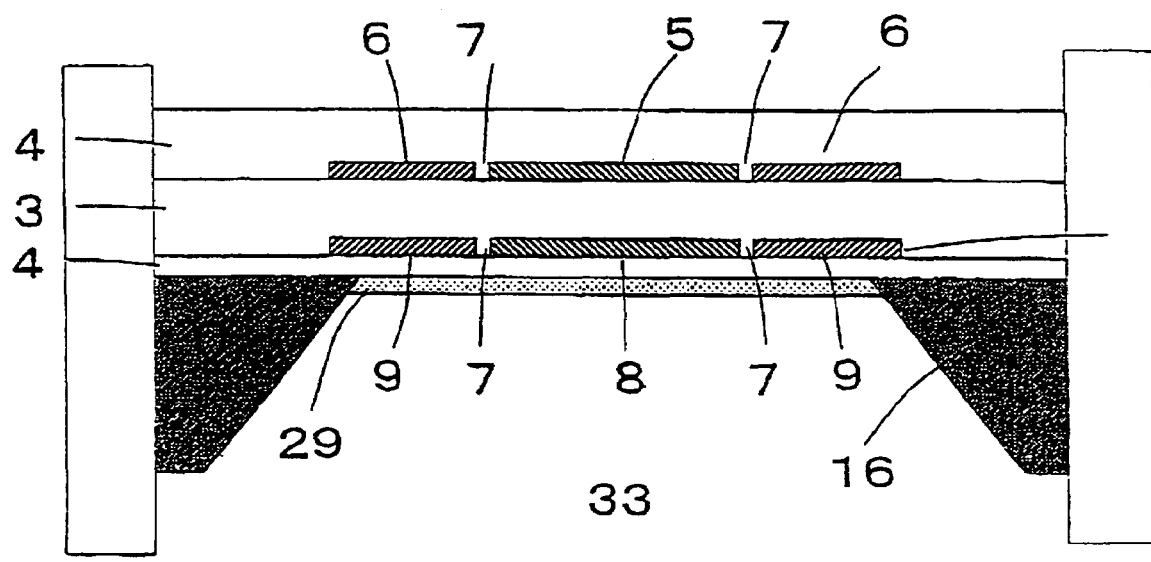
FIG. 4 is a sectional view showing the aberration correcting mirror according to the invention.
Figure 5:
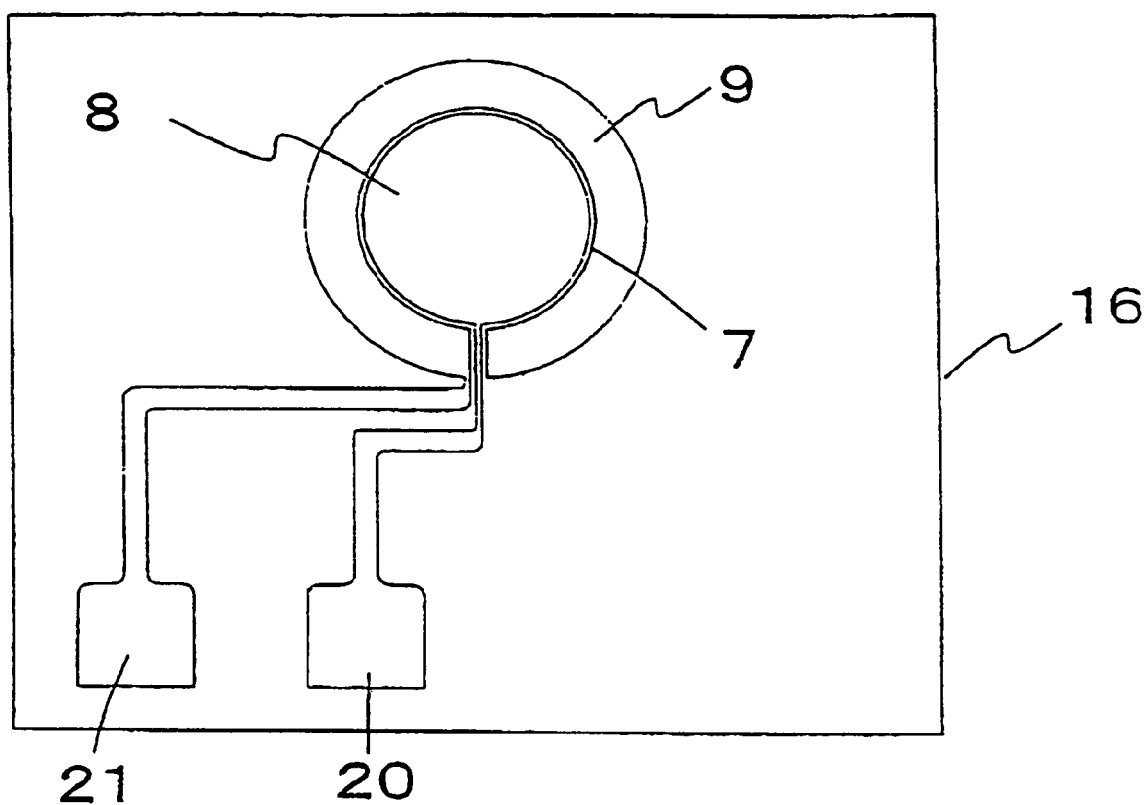
FIG. 5 is a plan view showing a lower electrode in the aberration correcting mirror according to the invention.
Figure 6:
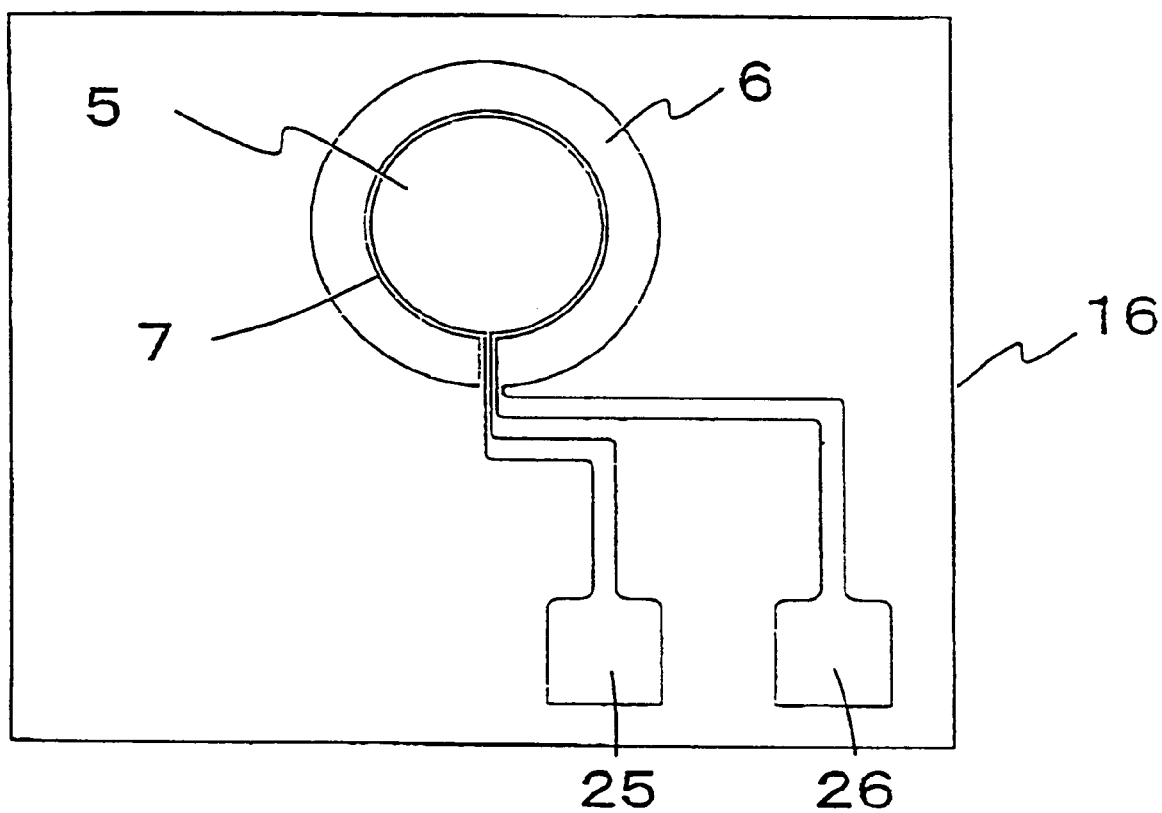
FIG. 6 is a plan view showing an upper electrode in the aberration correcting mirror according to the invention.

Next, the specific structure of an aberration correcting mirror according to an embodiment of the invention will be described with reference to FIGS. 4, 5 and 6. FIG. 4 is a sectional view showing the layer structure of the aberration correcting mirror. In FIG. 4, a cavity portion 33 is formed in a substrate 16. In the layer structure, in an ascending order, a reflective film 29 is provided in the cavity portion 33, an elastic unit 4 is provided to cover the cavity portion 33 and is bonded to the reflective film 29 and the substrate 16, a first lower electrode 8 and a second lower electrode 9 are provided on the elastic unit 4 on almost the level with each other, a piezoelectric unit 3 is provided on the elastic unit 4 in order to cover the first lower electrode 8 and the second lower electrode 9, a first upper electrode 5 and a second upper electrode 6 are provided on the piezoelectric unit 3 on almost the level with each other, and an elastic unit 4 is provided on the piezoelectric unit 3 in order to cover the first upper electrode 5 and the second upper electrode 6, and a film can be deformed freely within a range of the diameter of the cavity portion 33. The circumference of the cavity portion 33 serves as a fixed boundary for constraining the displacement of the film, and the cavity portion 33 is provided more thinly than the other portions of the substrate 16 by removing a part of the substrate 16 to form a concave portion. FIG. 5 is a plan view showing the lower electrode. The lower electrode is divided into two electrodes, that is, a first lower electrode 8 taking a circular shape and a second lower electrode 9 which is concentric with the first lower electrode 8 and takes an annular shape through an insulating portion 7. The first lower electrode 8 is connected to an electrode pad 20 and the second lower electrode 9 is connected to an electrode pad 21. FIG. 6 is a plan view showing the upper electrode. The upper electrode is also divided into the same shapes as those of the lower electrode, and is constituted by the first upper electrode 5, the second upper electrode 6 and the insulating portion 7. The first upper electrode 5 and the second upper electrode 6 are wired to electrode pads 25 and 26, respectively. In each of the upper electrode and the lower electrode, the second electrode is partially provided with a portion in which an electrode is not arranged, and the wire led from the first electrode is provided through the portion in which the electrode is not arranged, and the second electrode is annular and almost C-shaped.

Next, description will be given to an example in which the structure is fabricated. First of all, the elastic unit 4, the first lower electrode 8 and the second lower electrode 9 are formed over the whole plate-shaped substrate 16, and the piezoelectric unit 3 is formed thereon, the first upper electrode 5 and the second upper electrode 6 are formed on the piezoelectric unit 3, and the elastic unit 4 is provided thereon. Then, patterning is carried out over an opposite surface to the surface of the substrate 16 provided with the laminated film by using photolithography, and dry etching or wet etching is carried out to perform a processing until the elastic unit 4 on the substrate 16 side is uncovered. Thereafter, the reflective film 29 is formed on the elastic unit 4 from the side on which the etching is carried out.

As another method, moreover, the etching is stopped before the elastic unit 4 is uncovered, and a part of the substrate 16 is left in an etching portion in the process. Since a part of the substrate 16 is formed very thinly, a displacement can easily be carried out. In the same manner as described above, the reflective film 29 is formed in a portion in which the substrate 16 is thinned.

As a further method, it is also possible to form the laminated film on another substrate, and furthermore, to form a through hole or a concave portion to be the cavity portion 33 on the substrate 16, and to then push another substrate against the substrate 16, thereby transferring the laminated film to cover the cavity portion 33 of the substrate 16.

In the embodiment, the cavity portion 33 has such a structure that a sectional area is larger on an opposite side to a side on which the laminated film is provided, and the laminated film side has a smaller sectional area. Consequently, a light can be efficiently led to the reflective film 29. Depending on a specification, the cavity portion 33 may be constituted with an equal sectional area, or the sectional area on the laminated film side may be large and the sectional area on the opposite side may be small. In the embodiment, the section of the cavity portion 33 takes a circular shape. For this reason, there is employed a structure in which the diameter of the section on the laminated film side is small and the diameter of the section on the opposite side thereto is large.

Figure 7:
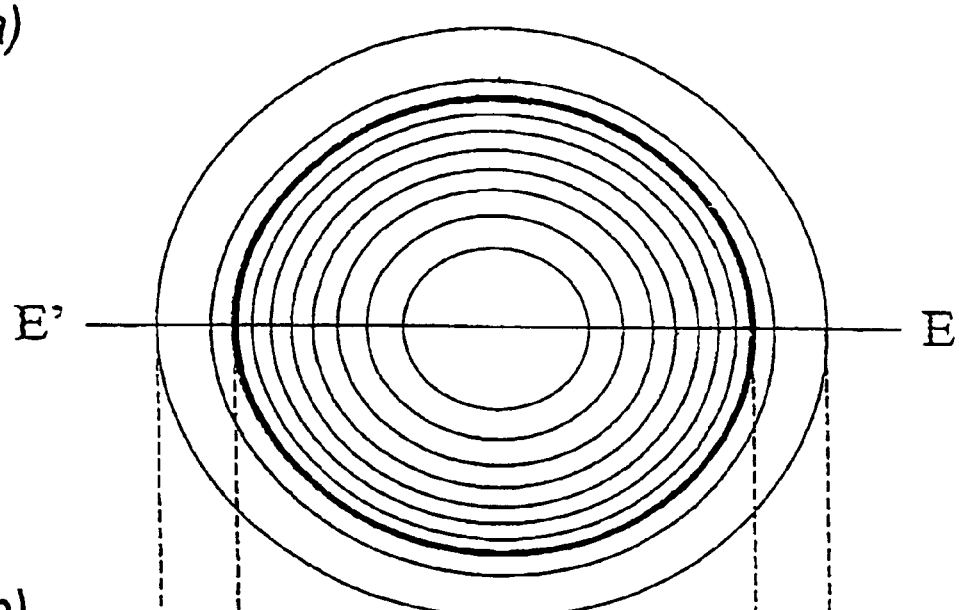
FIG. 7 is a diagram showing the contour line of the displacement of the aberration correcting mirror according to the invention and is a chart showing the displacement.
Figure 7:
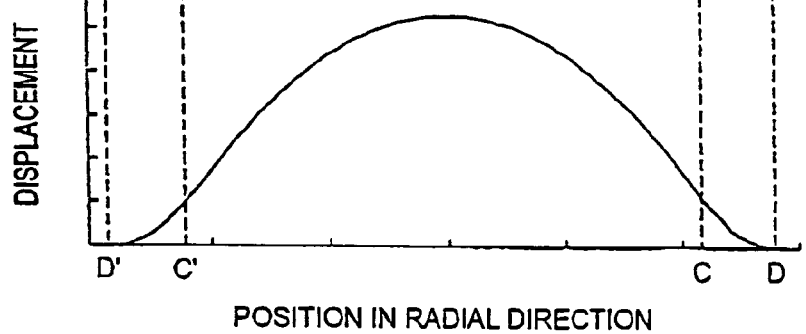

FIG. 7 shows the case in which the first upper electrode 5 and the second lower electrode 9 are grounded and a voltage V is applied to the second upper electrode 6 and the first lower electrode 8 in the structure described above, (a) illustrating the contour line of the displacement of a reflective film and (b) illustrating the displacement In the drawings, C, C' and D, D' correspond to the positions of the circumferences of the insulating portion and the cavity portion, respectively. The positions of D, D' indicate the cavity circumference, in which the displacement is constrained. Consequently, the displacement is zero. The displacement is downward convexed in an annular portion corresponding to C-D and C'-D', and is upward convexed in a portion corresponding to the diameter of C-C' with the boundary of C and C'. Thus, the reason why the sign of a curvature is reversed with an electrode dividing position to be a boundary has been described above. Although a spherical shape is generally required for correcting a spherical aberration, a curved shape on C-C' is spherical. In the invention, accordingly, a curved portion on C-C', that is, a portion of the reflective film corresponding to the shape of the first electrode or an inside thereof is used. Consequently, it is possible to implement an aberration correction with very high precision.

Figure 8:
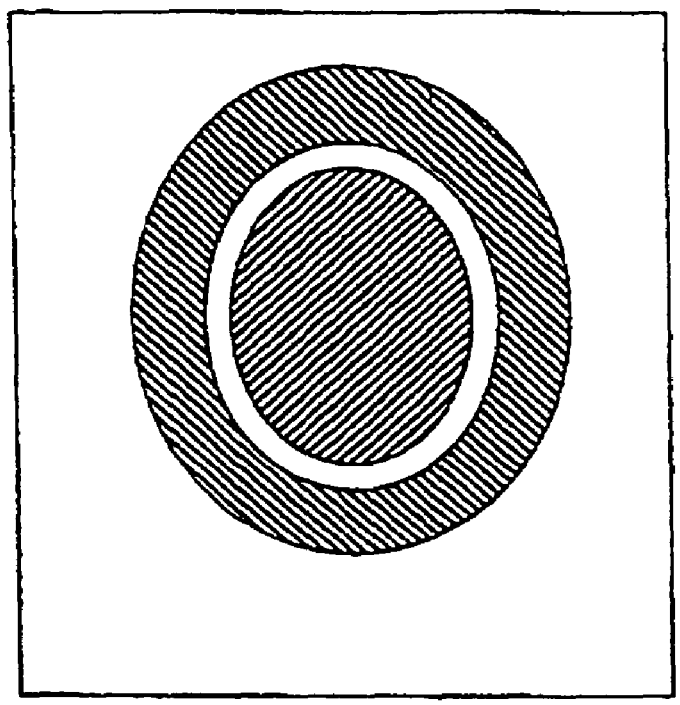
FIG. 8 is a plan view showing an upper electrode and a cavity portion in another configuration of the invention.
Figure 8:
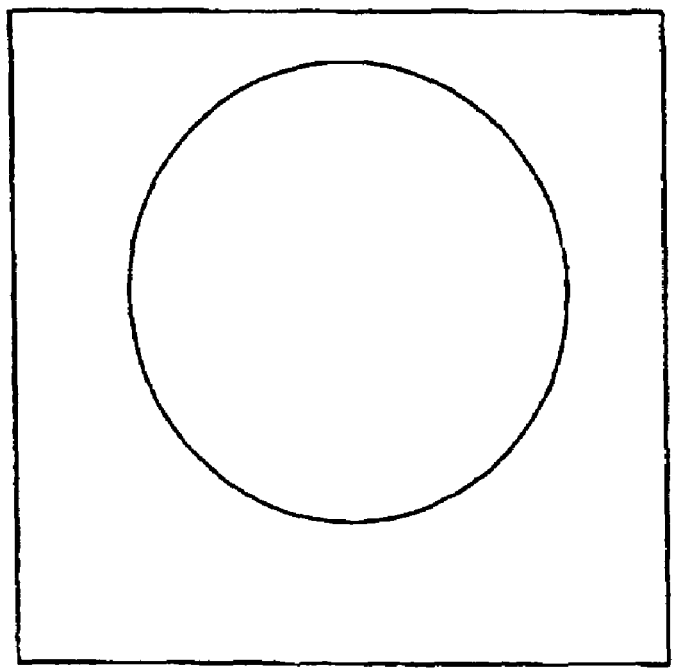
Figure 9:
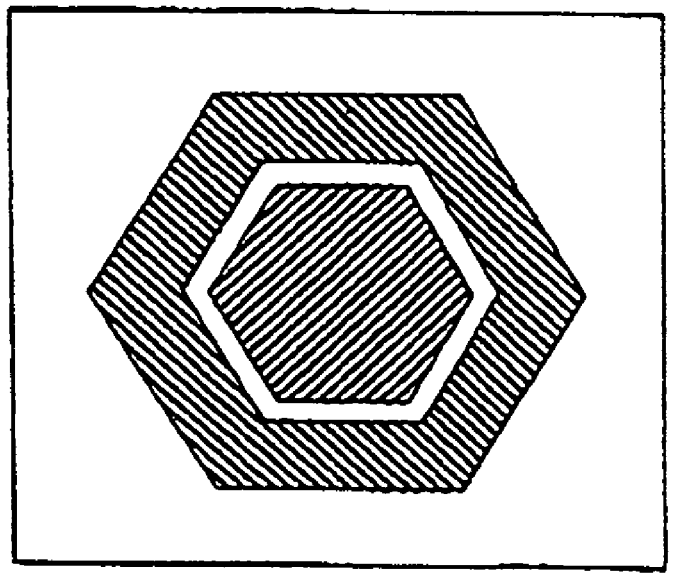
FIG. 9 is a plan view showing an upper electrode and a cavity portion in yet another configuration of the invention.
Figure 9:
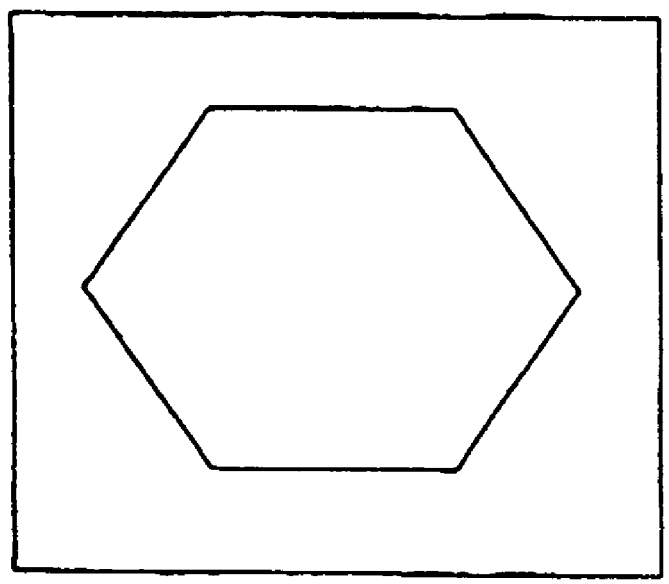
Figure 10:
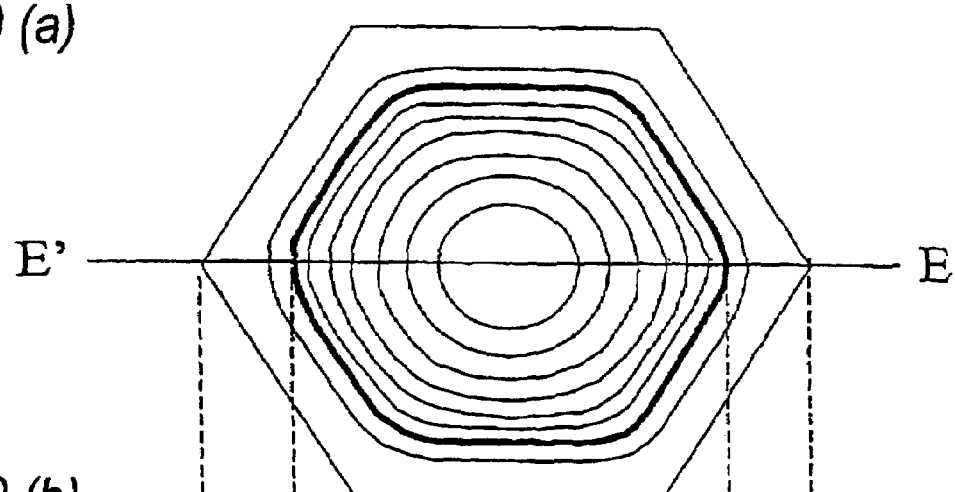
FIG. 10 is a diagram showing the displacement of the aberration correcting mirror according to the invention.
Figure 10:
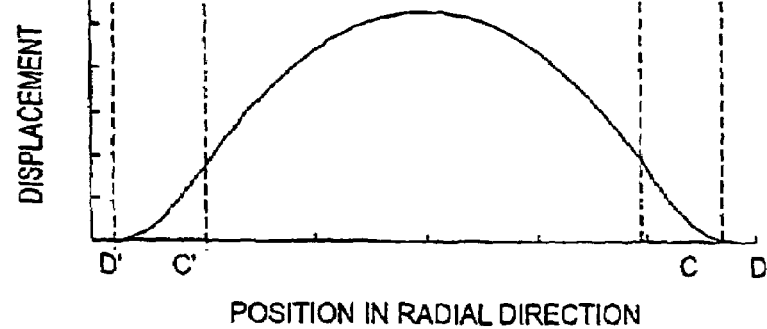

FIG. 8 shows an example of the shapes of the upper electrode and the cavity portion 33 in the aberration correcting mirror which is preferably applied to the case in which a light beam is obliquely incident on an aberration mirror (a lead electrode and a wired electrode are not shown). The upper electrode (FIG. 8(a)) and the cavity portion 33 (FIG. 8(b)) take concentric elliptical shapes. By this structure, s spherical aberration can be corrected effectively for the oblique incident light. The lower electrode takes the same shape as the shape of the upper electrode (the shape of an electrode will be described below by using only the upper electrode). The shapes of the first electrode and the cavity portion do not need to be (elliptical) circular if they are symmetrical about an optical axis. For example, the shape may be a regular hexagon as shown in FIG. 9. FIGS. 9(a) and (b) show the upper electrode and the cavity portion, respectively (a lead electrode and a wired electrode are not shown). FIG. 10 shows a contour line for a displacement in the structure of FIG. 9 and is a graph showing a displacement amount in an E-E' section. In each section taken along a central axis, the displacement takes a shape expressed in secondary and higher-order even terms. C and C' indicate places corresponding to a dividing position for insulating the first electrode and the second electrode. Moreover, D and D' indicate places corresponding to the circumference of the cavity portion 33. It is apparent that the contour line of the whole displacement reflects the shape of the regular hexagon in the peripheral part of the cavity portion and converges on a circle toward a center. According to the invention, the inner part of the first electrode is used as a mirror portion. Even if the shape of the electrode is a hexagon, therefore, a spherical aberration can be corrected well Thus, the shapes of the first electrode and the cavity may be regular polygons. Moreover, the first electrode and the cavity do not need to take the same shape if they are symmetrical about a central axis. For example, even if the shape of the first electrode is a circle and the shape of the cavity is a regular hexagon, it is possible to obtain the same advantages according to the invention.

Since the displacement is constrained by the circumference of the cavity portion, the shape of the second electrode does not play an essentially important part. If the second electrode takes at least the same shape as the shape of the cavity portion or such a shape as to completely include the cavity portion, accordingly, the advantages of the invention can be prevented from being reduced.

Figure 11:
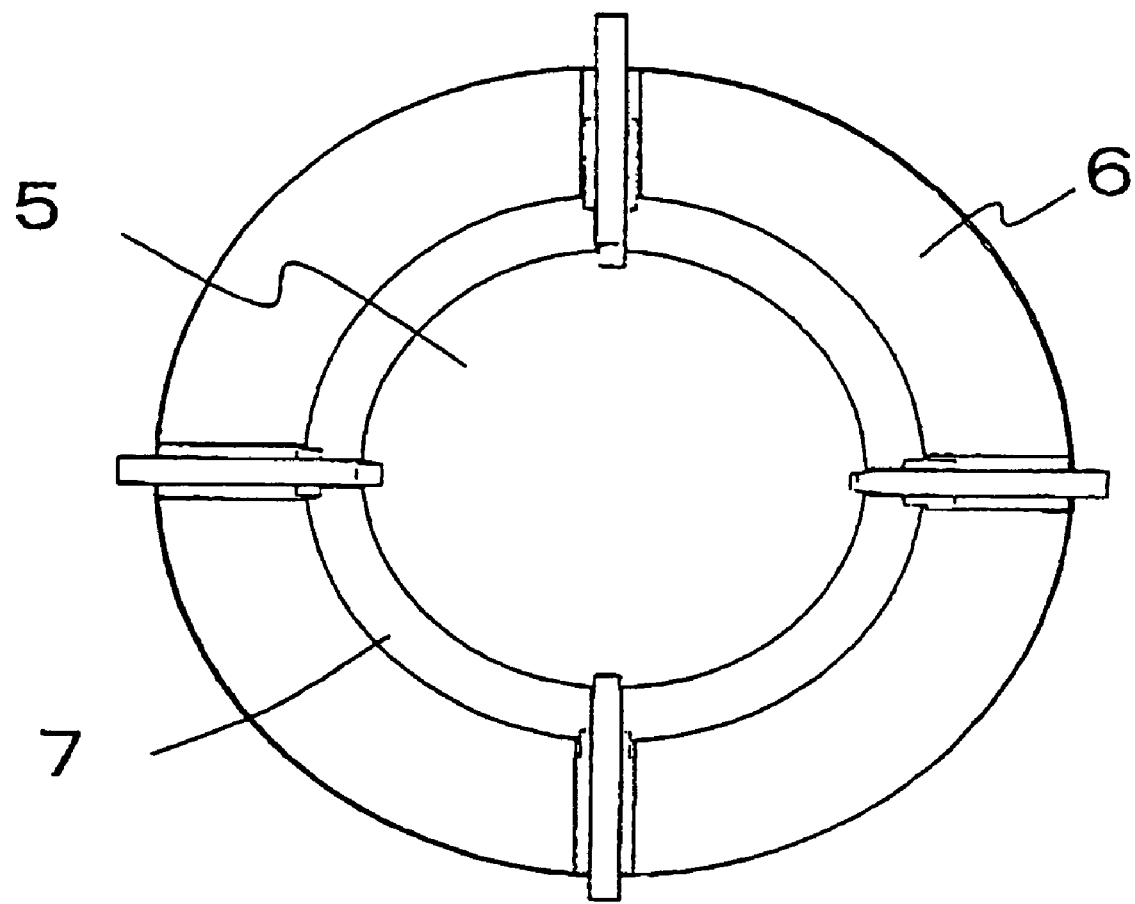
FIG. 11 is a plan view showing an upper electrode in a further configuration of the invention.

Any number of wiring portions from the first electrode to an electrode pad can be provided radially from the central axis. In FIG. 11, four wiring portions are provided to have a four-time symmetry about the central axis (the wired line is not shown). It is also possible to lead eight wiring portions with an eight-time symmetry. It is preferable that the number of lead wires which are provided to enhance a symmetry should be as small as possible. Moreover, the wired line is provided on the outside of the cavity portion. Therefore, any geometrical shape can produce the advantages of the invention.

Figure 12:
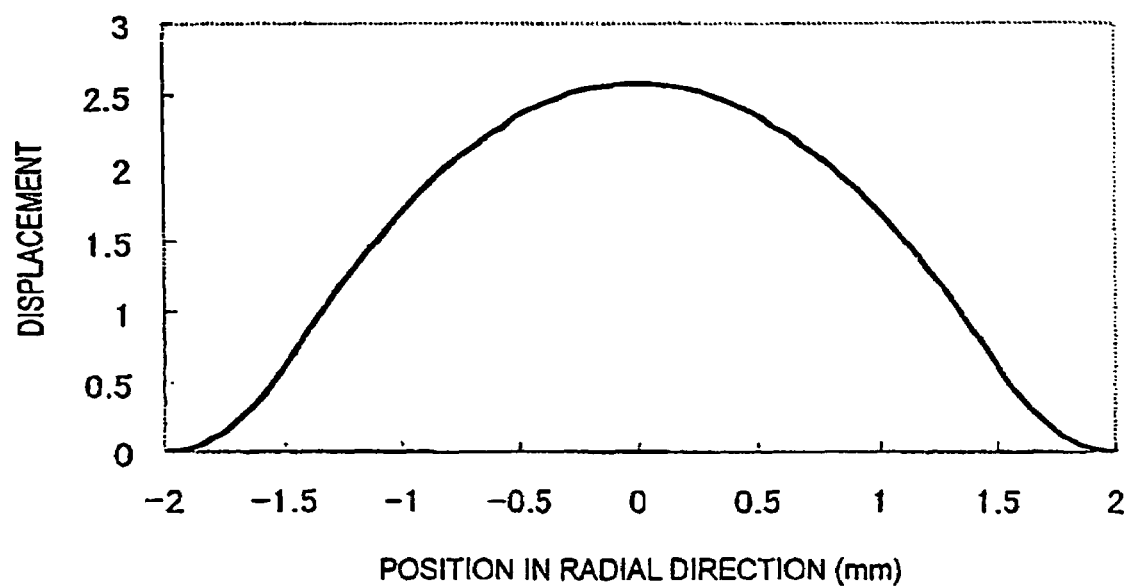
FIG. 12 is a chart showing a displacement according to an example of the invention.
Figure 13:
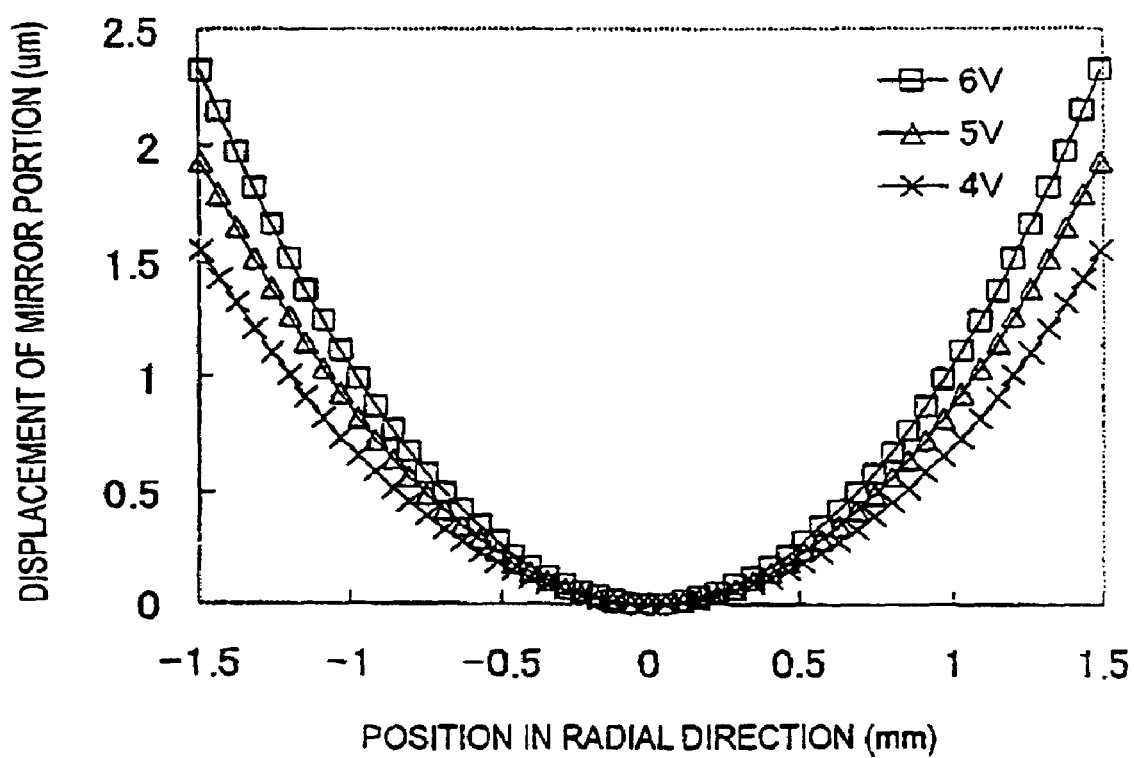
FIG. 13 is a chart showing the displacement of a mirror portion according to the example of the invention.

Description will be given to an example in which a calculation is carried out by using a general purpose analytical software ANSYS. A cavity was set to be a circle having a radius of 2 mm and a cylinder having a thickness of 10.7 μm on a cavity portion was set to be an analytic region. For a layer structure, $SiO_2$ (elastic unit): 1 μm, Ti (lower electrode): 0.2 μm, PZT (piezoelectric unit): 3 μm, Cr (upper electrode): 0.5 μm, $SiO_2$ (elastic unit): 1 μm, and Ni (elastic unit): 5 μm were provided in an ascending order. Each of the upper electrode and the lower electrode is divided into a first electrode and a second electrode through an annular insulating portion having a thickness of 20 μm. The first electrode was set to be a circle (cylinder) which is concentric with the cavity portion and has a radius of 1.49 mm and the second electrode was set to take an annular (cylindrical) shape having an inside radius of 1.51 mm and an outside radius of 2.0 mm. 0V was applied to the first upper electrode 5, 10V was applied to the first lower electrode 8, 10V was applied to the second upper electrode 6 and 0V was applied to the second lower electrode 9 to carry out a piezoelectric analysis. As a result, a displacement shown in FIG. 12 was obtained. FIG. 12 shows a displacement amount in a certain section taken along a central axis in the whole cavity portion 33. It is apparent that a spherical shape is obtained in the first electrode, that is, within a range of −1.49 to +1.49 FIG. 13 is a graph obtained by plotting the absolute value of a displacement with a maximum displaced portion (center) set to be an origin based on displacement data when potential differences of 4V, 5V and 6V are applied in the same structure, showing the shape and amount of a displacement for only the mirror portion (the reflective film 29). By changing the potential difference, thus, it is possible to obtain spherical shapes having different shape factors.

Figure 14:
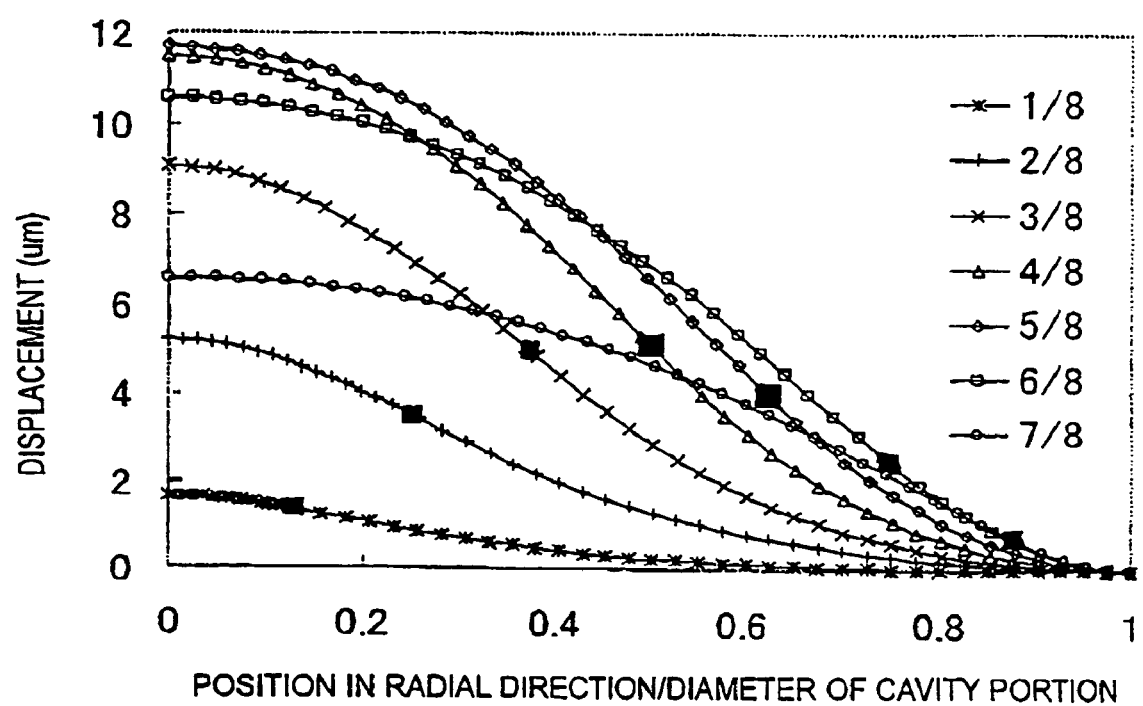
FIG. 14 is a chart showing a displacement according to the example of the invention.
Figure 15:
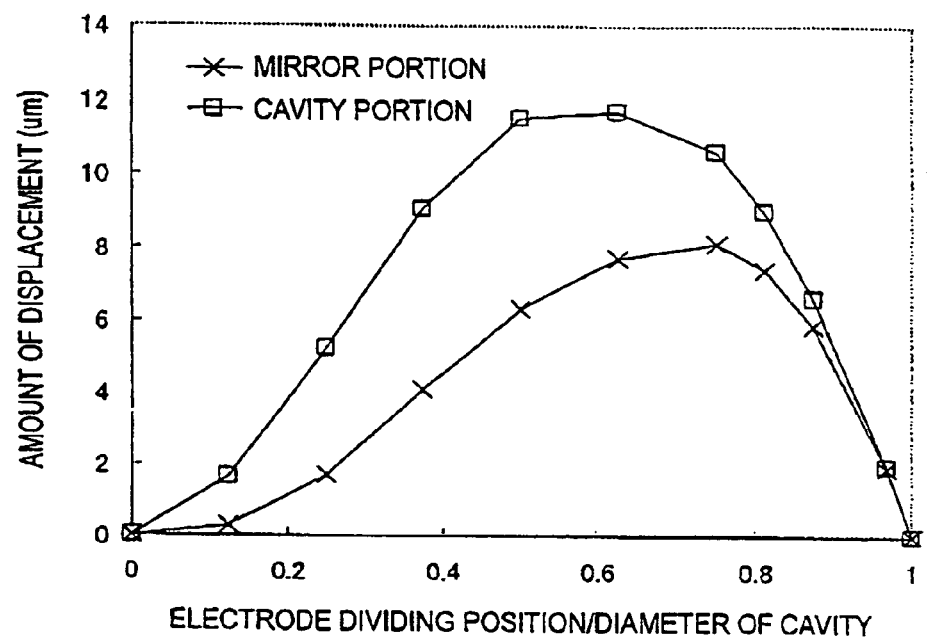
FIG. 15 is a chart showing the maximum displacement amount of the aberration correcting mirror according to the invention.

Furthermore, FIG. 14 is a chart showing a displacement in a radial direction of the whole cavity portion 33 in the case in which a dividing position in the radial direction of the cavity portion 33 of the upper electrode is varied to be 1/8, 2/8, 3/8, 4/8, 5/8, 6/8 and 7/8 with respect to the radius of the cavity in the same structure. The position is standardized with the radius of the cavity. ■ indicates an electrode dividing position. Thus, it is possible to change the amount of a displacement and the shape of a deformation by varying the electrode dividing position. FIG. 15 shows a relationship between maximum displacement amounts in the cavity portion 33 and the mirror portion for the electrode dividing position, respectively. Consequently, it was found that the displacement amount of the mirror portion (the reflective film 29) is a maximum in the vicinity of a dividing ratio of r/R=0.75. r and R represent a mirror radius and a cavity radius, respectively. More specifically, it was found that a large amount of the deformation can be obtained particularly efficiently with the electrode dividing ratio r/R of 0.7 to 0.8. On the other hand, in consideration of the case in which the mirror portion (the reflective film 29) is fabricated through a semiconductor process and is cut out of a wafer, the number of dies of the mirror is more increased with the dividing ratio r/R approximating to 1 and a cost is thereby reduced when the mirror diameter is decided. In order to optimize the deformation efficiency and cost of the mirror, accordingly, it is preferable that the electrode dividing ratio r/R should be equal to or higher than approximately 0.7 and should be lower than approximately 1. Moreover, the same analysis is carried out with a cavity diameter of 1.5 mm and 1 mm so that the same results as those in FIG. 15 are obtained. With the hexagonal cavity and electrode shown in FIG. 9, furthermore, if the dividing ratio r/R is defined for a hexagonal circumcircle, similarly, the maximum value of the displacement amount of the mirror portion is obtained within a range of 0.7 to 0.8. From the foregoing, it is possible to provide an inexpensive aberration correcting mirror which is the most efficient in an almost optional shape and size by setting the ratio of the mirror diameter to the cavity diameter to be equal to or higher than 0.7 and lower than 1.

The suitable examples have simply been described above. A dynamic spherical aberration can be corrected effectively by utilizing any practical piezoelectric and elastic units if the invention is used. For example, it is possible to use, for the piezoelectric unit 3, a rock crystal, $LiLiNbO_3$, $LiTaO_3$, $KNbO_3$, ZnO, AIN, $Pb(Zr, Ti)O_3$ and PVDF (polyvinylidene fluoride) including PZT (zircon titanate). By using Ni, Ti, Cu, Cr, Au, Pt or a metal as the elastic unit 4, and furthermore, causing the first electrode and the cavity portion 33 to take any shape having a certain symmetry about a central axis, it is possible to effectively correct a spherical aberration. If the second electrode takes the same shape as that of the cavity portion 33 or such a shape as to include the cavity portion 33, the shape is entirely optional within a range in which a wiring is formed. Moreover, it is apparent that just the same advantages can be obtained even if the upper electrode is set to be a common electrode and the lower electrode is divided. Furthermore, both the upper electrode and the lower electrode may be divided.

While the optical pick-up has been described in the embodiment, it is a matter of course that the invention can also be applied to other optical devices.

As described above, according to the invention, it is possible to carry out a spherical aberration correction which is very small-sized and has power saving, an excellent responsiveness and high precision. Consequently, it is possible to utilize the invention for an optical pick-up to be used in a CD/DVD drive recorder, a decoder and a CD/DVD drive, particularly, an optical pick-up using a blue laser and an optical device requiring to correct an aberration.

Another configuration according to the invention is characterized in that the cavity portion is circular. By this structure, particularly, it is possible to obtain an advantage that a spherical aberration is effectively corrected when a beam is vertically incident on the mirror.

Yet another configuration according to the invention is characterized in that the shape of the first electrode is circular By this structure, particularly, it is possible to obtain an advantage that a spherical aberration is effectively corrected when a beam is vertically incident on the mirror.

A further configuration according to the invention is characterized in that the cavity portion and the shape of the first electrode are concentric with each other. By this structure, it is possible to obtain an advantage that precision in a spherical aberration correction can be particularly enhanced.

A further configuration according to the invention is characterized in that a ratio r/R of an outside diameter r of the first electrode to an outside diameter R of the second electrode is equal to or higher than 0.7 and is lower than 1. By setting the ratio r/R to be approximately 0.75, it is possible to produce an advantage that a maximum amount of a displacement can be obtained when a voltage having a certain magnitude is applied irrespective of the outside diameter of a device. When the ratio r/R approximates to 1, moreover, the size of the whole device is reduced for a certain mirror diameter which is required. Consequently, it is possible to obtain an advantage that the number of dies can be increased and a cost can be reduced.

A further configuration according to the invention is characterized in that the initial shape of the mirror is schematically planar. Consequently, it is not necessary to initially take the shape of the mirror. Thus, it is possible to obtain an advantage that a manufacture can easily be carried out.

A further configuration according to the invention is characterized in that a lead wire from the first electrode is symmetrical about an axis of the first electrode. By this structure, the lead wire does not break the symmetry of the shape of the mirror. Thus, it is possible to carry out an effective spherical aberration correction.

A further configuration according to the invention is characterized in that the piezoelectric unit is a thin film. Consequently, it is possible to obtain an advantage that a lower voltage than that in a bulk is enough in order to obtain a piezoelectric distortion having a proper magnitude. In particular, it is possible to produce an advantage that a necessary amount of a deformation can be obtained from several to several tens volts.

A further configuration according to the invention is characterized in that only the first electrode of the piezoelectric device which is deformed is used as the mirror. Consequently, it is possible to selectively use only a portion taking the spherical shape. Thus, it is possible to carry out an optimum spherical aberration correction.

By the above structure, a reflecting plane can be deformed with high precision. Consequently, it is possible to reduce an aberration, particularly, a spherical aberration. In the case in which the reflecting plane is used as an optical pick-up, it is possible to enhance recording and reproducing characteristics.

Second Embodiment

Figure 21:
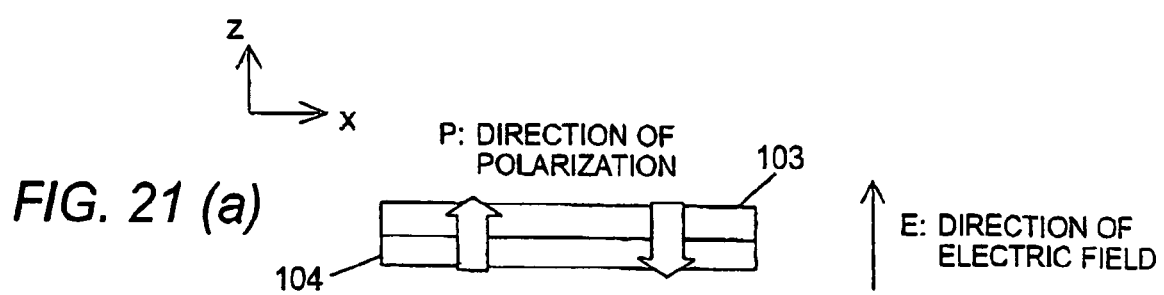
FIG. 21 is a view showing the operation principle of an aberration correcting mirror according to the invention.
Figure 21:
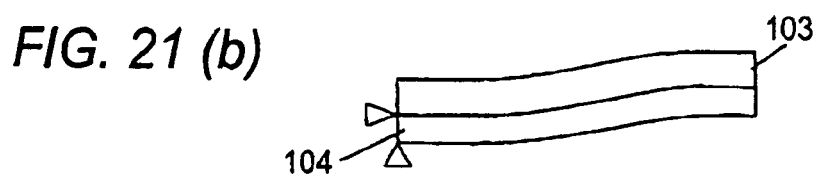
Figure 22:
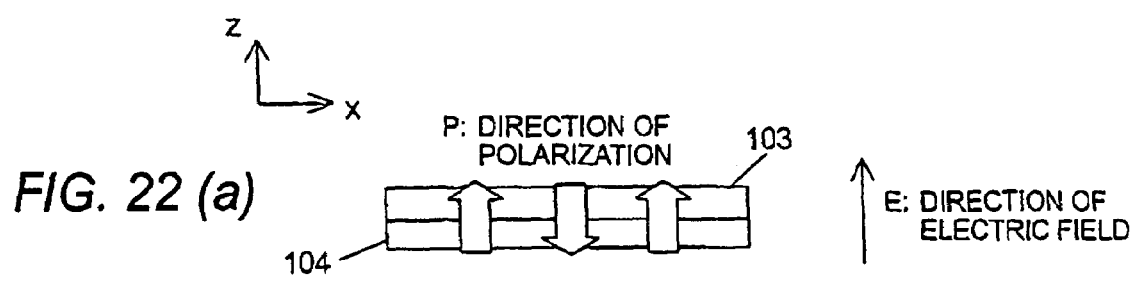
FIG. 22 is a view showing the operation principle of the aberration correcting mirror according to the invention.
Figure 22:
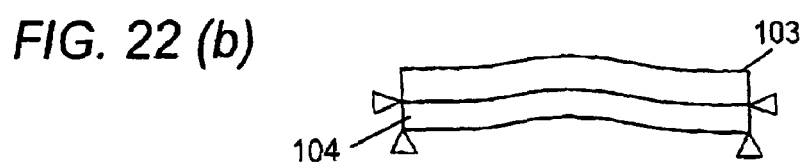
Figure 23:
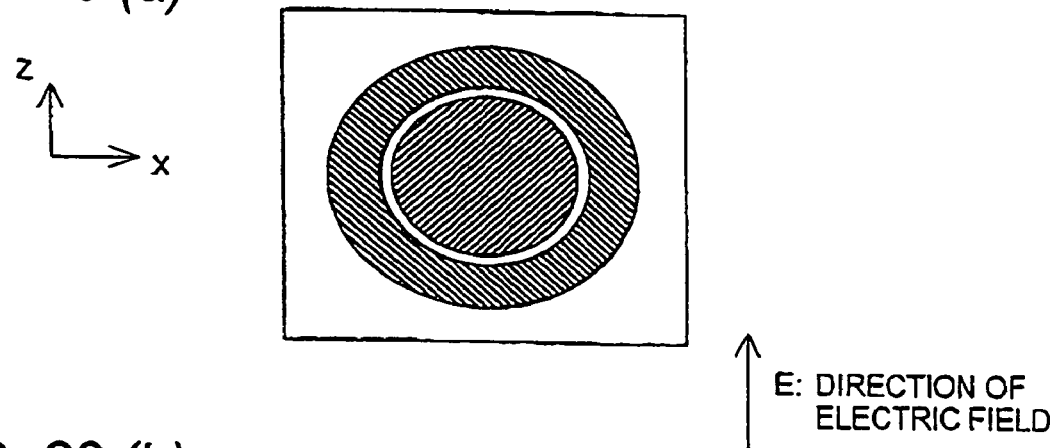
FIG. 23 is a view typically showing the aberration correcting mirror according to the invention.
Figure 23:
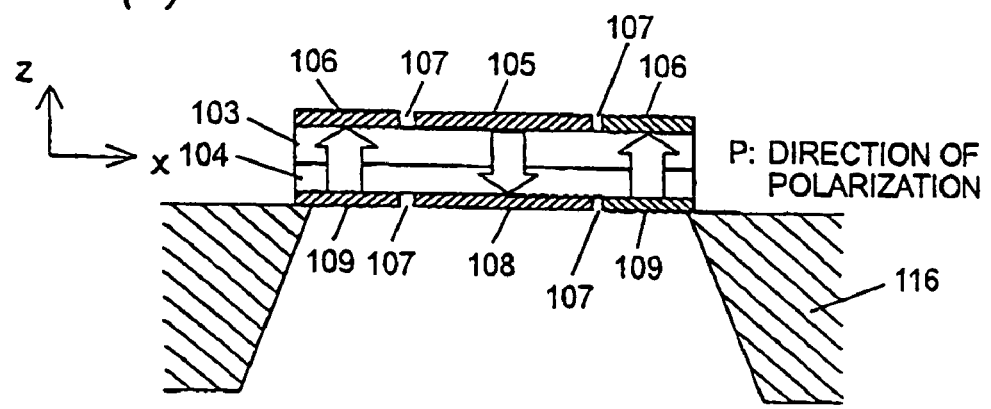

A basic structure according to an embodiment of the invention will be described below with reference to FIGS. 21, 22 and 23. FIG. 21 is a typical sectional view showing a unimolf type piezoelectric device taking the shape of a beam in which a piezoelectric unit 103 and an elastic unit 104 are bonded to each other. The piezoelectric unit 103 is polarized in a +z direction. As compared with the conventional art, the direction of a polarization is not set to be one direction but a polarization processing is carried out in the +z direction in a region on a left side and a –z direction in a region on a right side in the drawing according to the invention. In this case, it can be understood from the above description that the region on the left side in the drawing is downward convexed and the region on the right side in the drawing is upward convexed. Accordingly, an inflection point is generated in the vicinity of a boundary between both of the regions. By utilizing the fact, when a polarizing distribution inverted alternately is applied as shown in FIG. 22, a bending moment is generated to take an upward convex shape in a central part and a downward convex shape at both ends so that the inflection point is formed in two places. Also in the case in which both ends are constrained, therefore, a great displacement can be obtained. By using the same method, any number of inflection points can be formed. Consequently, it is possible to fabricate a mirror taking such a shape as to have a practical displacement amount and to correspond to various aberrations. FIG. 23 is a typical view showing one configuration for implementing the same advantages circularly, and a plan view and a sectional view taken along a center. The piezoelectric unit 103 has an upper electrode formed in an upper part and a lower electrode formed in a lower part. The upper electrode is divided into a first upper electrode 105 and a second upper electrode 106 through an insulating portion 107. Similarly, the lower electrode is also divided into a first lower electrode 8 and a second lower electrode 109 through the insulating portion 107. By this structure, it is possible to carry out the polarization processing in different directions from each other by applying electric fields having different polarities from each other in the respective first and lower electrode regions in the upper electrode and the lower electrode. Thus, it is possible to produce an advantage that a great displacement can be obtained as described above. While the insulating portion 107 is constituted with a spatial gap provided thereon in the embodiment, moreover, it is also possible to constitute the insulating portion 107 by burying an insulating material such as silicon dioxide or alumina in the gap. In the case in which the first electrode and the second electrode will be expressed as follows, the first electrode indicates at least one of the first upper electrode 105 and the first lower electrode 108, and the second electrode indicates at least one of the second upper electrode 106 and the second lower electrode 109.

Figure 36:
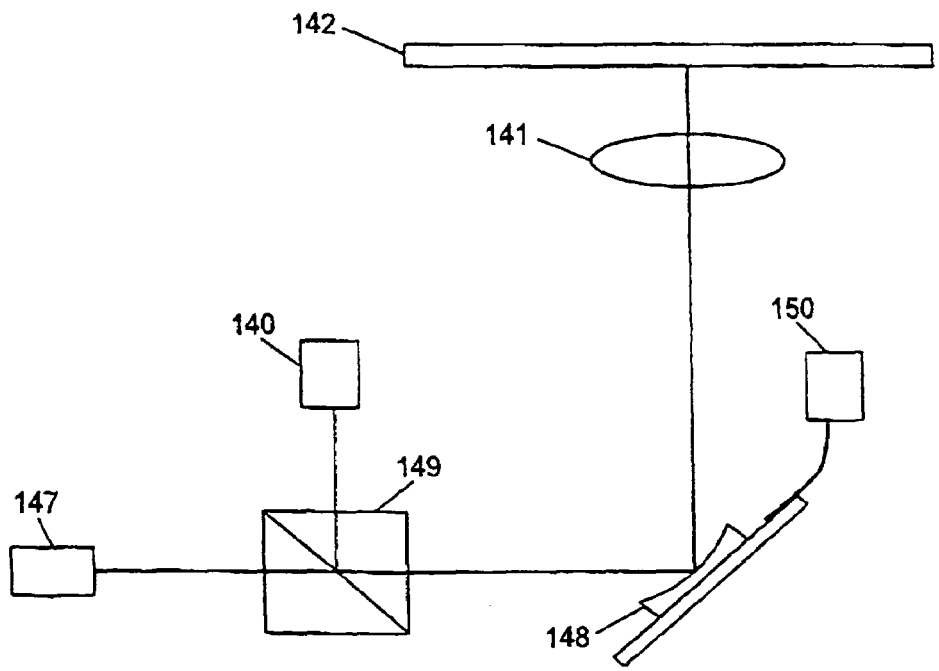
FIG. 36 is a view showing the optical path of an optical pick-up according to the invention.

FIG. 36 shows an example of the basic structure of an optical pick-up. A beam emitted from a light source 147 is transmitted through a beam splitter 149 and is reflected by an aberration correcting mirror 148 serving as a rising mirror, and passes through an objective lens 141 so that an image is formed on an optical disk 142. The light reflected therein is reflected by the aberration correcting mirror 148 and is then reflected by the beam splitter 149, and is converted into an electric signal in a photo-detector 140. By this structure, the beam is incident on the aberration correcting mirror 148 at 145 degrees. A control voltage is supplied from a driver 150 to the aberration correcting mirror 148. The driver 150 can determine the value of the control voltage and can change the curvature of the aberration correcting mirror based on a signal sent from at least one of a light receiver such as a photo-detector for a monitor (not shown) which serves to detect the amount of a spherical aberration and the photo-detector 140. In the case in which the light emitted from the light source 147 has a color from blue to violet and a short wavelength, the structure is particularly useful.

Figure 37:
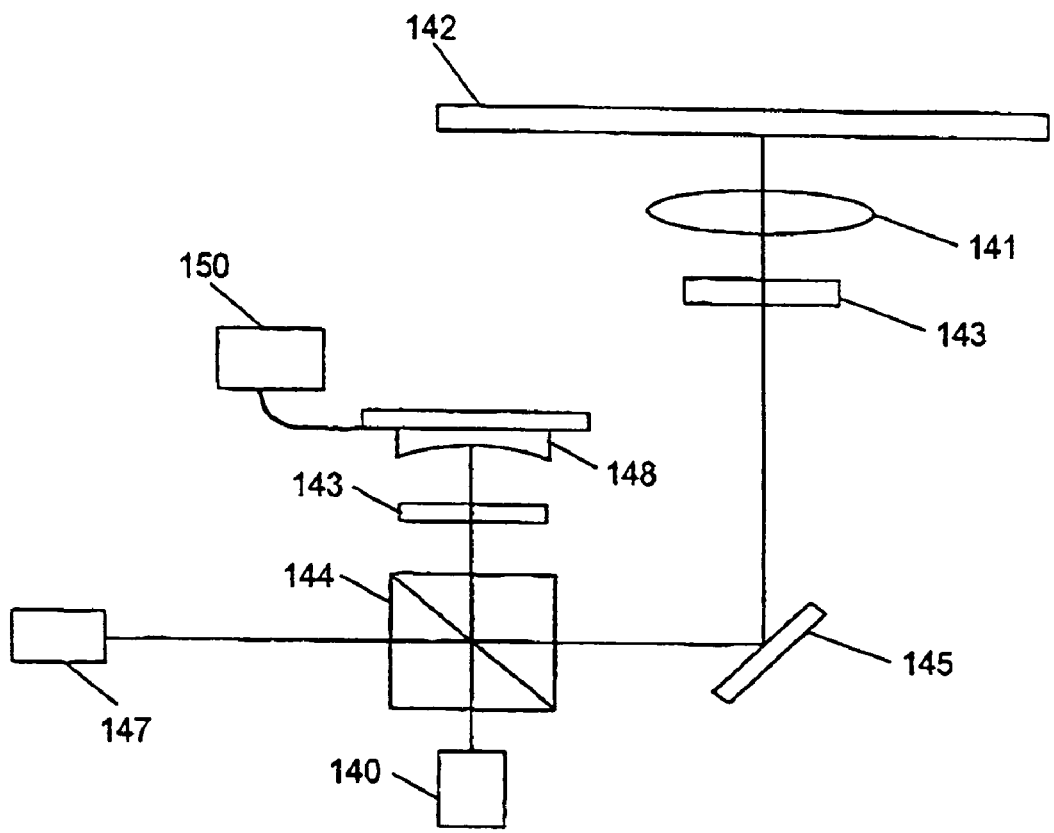
FIG. 37 is a view showing the optical path of an optical pick-up according to a further configuration of the invention.
Figure 38:
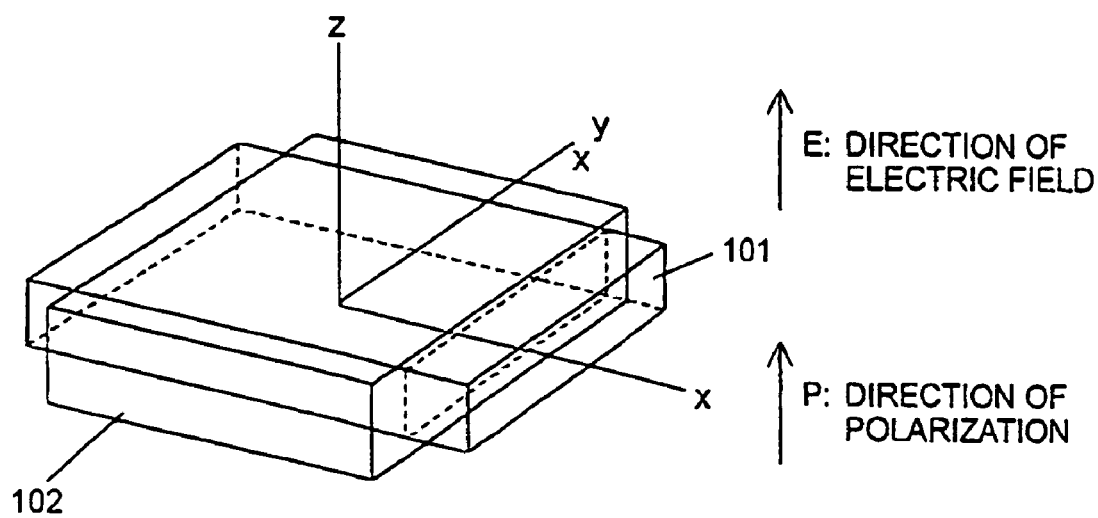
FIG. 38 is a perspective view showing the operation of a piezoelectric device.
Figure 39:
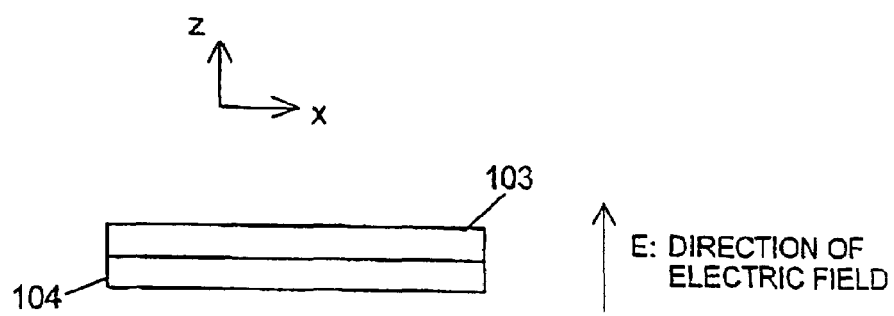
FIG. 39 is a sectional view showing the operation of the piezoelectric device.
Figure 39:
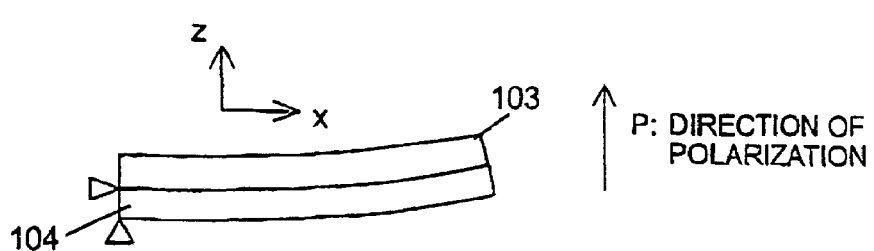

FIG. 37 shows the structure of an optical pick-up according to another configuration. A beam emitted from a light source 147 is transmitted through a polarizing beam splitter 144 and is reflected by a rising mirror 145, and passes through a ¼ wavelength plate 143 and an objective lens 141 and is collected onto a disk 142. Then, the light reflected by the optical disk 142 changes a polarizing state at 90 degrees, and passes through the rising mirror 145, is reflected by the polarizing beam splitter 144 and is transmitted through another ¼ wavelength plate 143, and is reflected by an aberration correcting mirror 148 and is transmitted through the ⁄1;4 wavelength plate 143 again to change the polarizing state at 90 degrees, and is then transmitted through the polarizing beam splitter 144 and is converted into an electric signal in a photo-detector 140. A control voltage is supplied from a driver 150 to the aberration correcting mirror 148. The driver 150 can determine the value of the control voltage and can change the curvature of the aberration correcting mirror based on a signal sent from at least one of a light receiver such as a photo-detector for a monitor (not shown) which serves to detect the amount of a spherical aberration and the photodetector 140. In the case in which the light emitted from the light source 147 has a color from blue to violet and a short wavelength, the structure is particularly useful.

Figure 24:
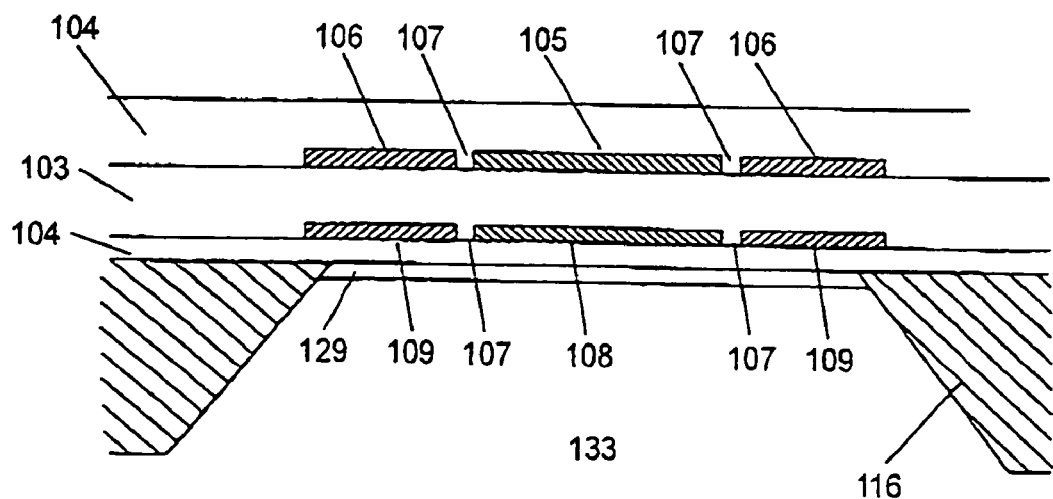
FIG. 24 is a sectional view showing the aberration correcting mirror according to the invention.
Figure 25:
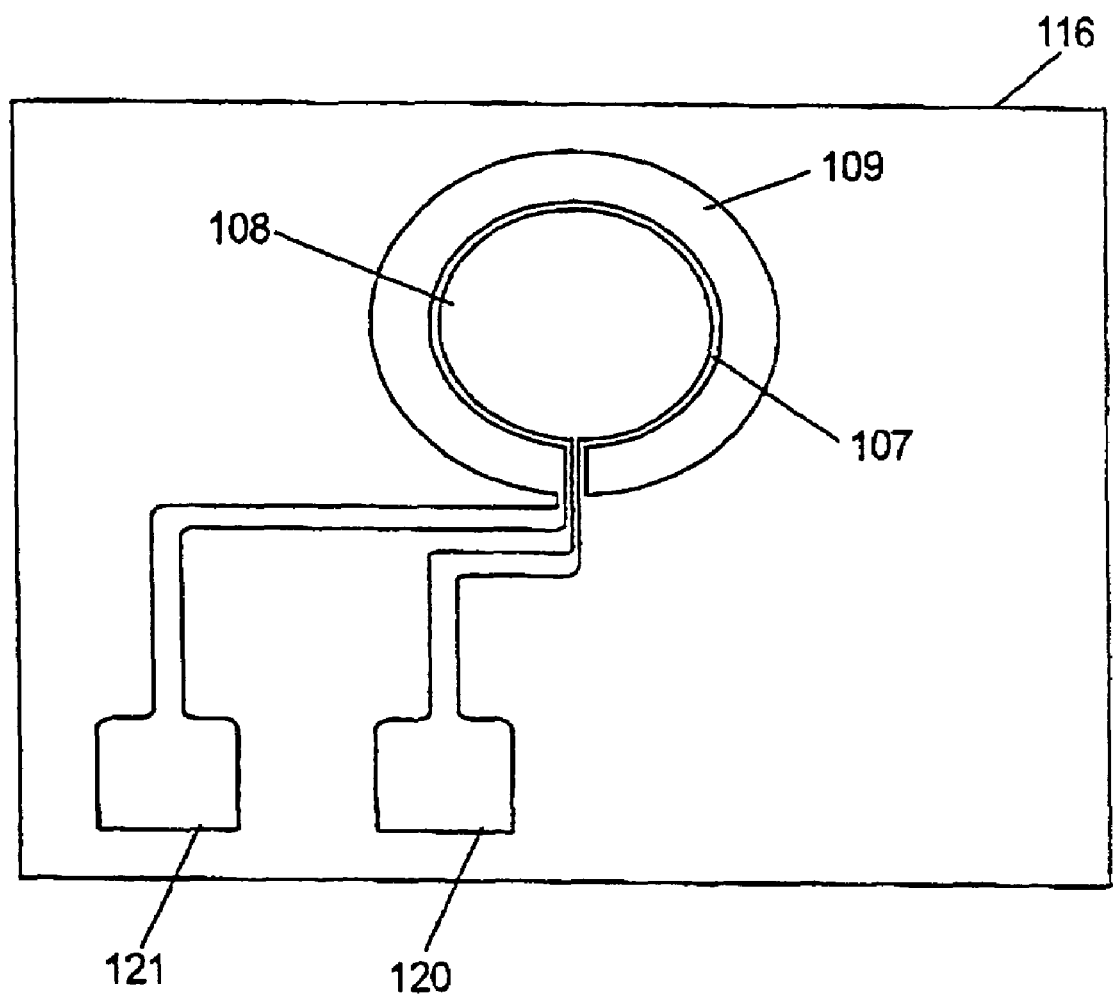
FIG. 25 is a plan view showing a lower electrode in the aberration correcting mirror according to the invention.
Figure 26:
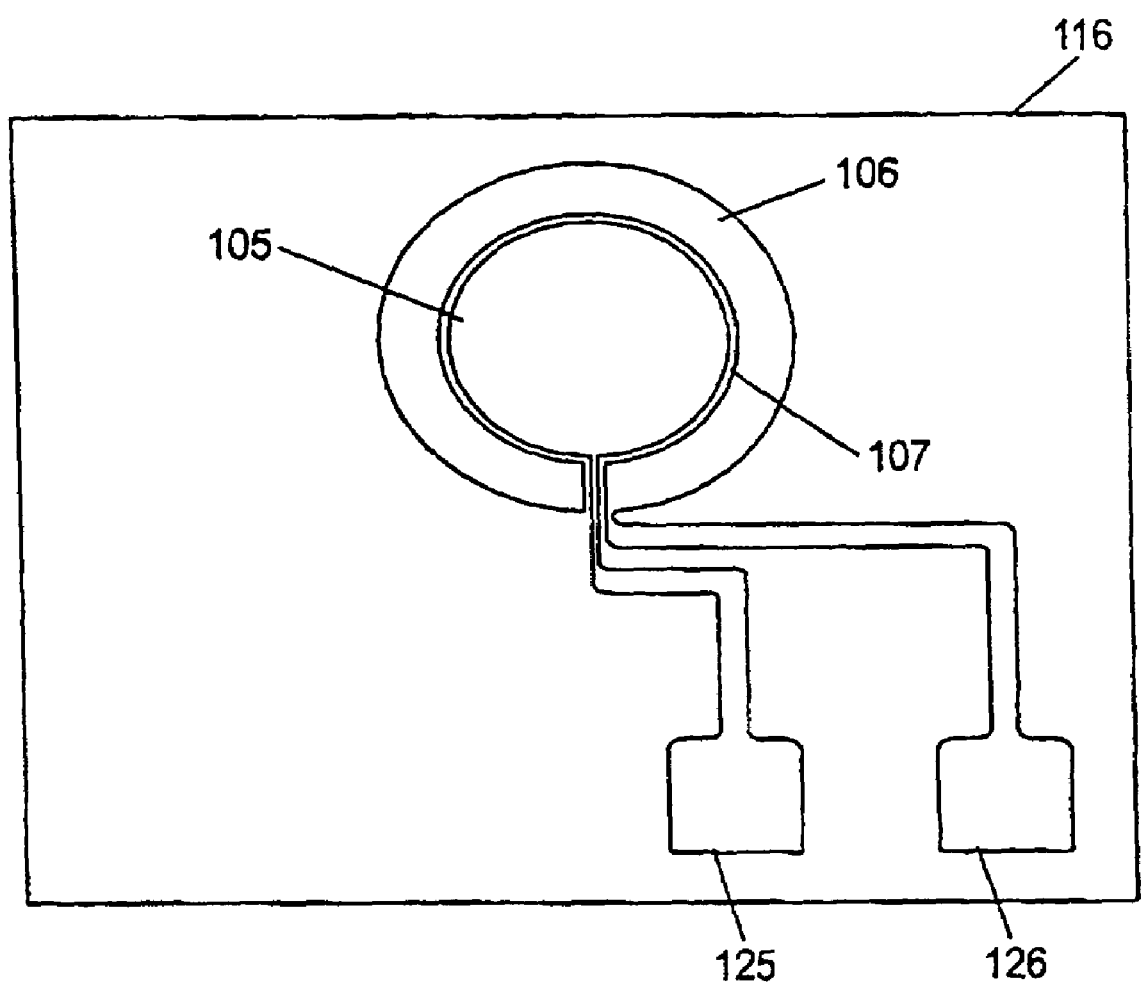
FIG. 26 is a plan view showing an upper electrode in the aberration correcting mirror according to the invention.

Next, the specific structure of an aberration correcting mirror according to an embodiment of the invention will be described with reference to FIGS. 24, 25 and 26. FIG. 24 is a sectional view showing the layer structure of the aberration correcting mirror. In FIG. 24, a cavity portion 133 is formed in a substrate 116. In the layer structure, in an ascending order, a reflective film 129 is provided in the cavity portion 133, an elastic unit 104 is provided to cover the cavity portion 133 and is bonded to the reflective film 129 and the substrate 116, a first lower electrode 108 and a second lower electrode 109 are provided on the elastic unit 104 on almost the level with each other, a piezoelectric unit 103 is provided on the elastic unit 104 in order to cover the first lower electrode 108 and the second lower electrode 109, a first upper electrode 105 and a second upper electrode 106 are provided on the piezoelectric unit 103 on almost the level with each other, and an elastic unit 104 is provided on the piezoelectric unit 103 in order to cover the first upper electrode 105 and the second upper electrode 106, and a film can be deformed freely within a range of the diameter of the cavity portion 133. The circumference of the cavity portion 133 serves as a fixed boundary for constraining the displacement of the film, and the cavity portion 133 is provided more thinly than the other portions of the substrate 116 by removing a part of the substrate 116 to form a concave portion. FIG. 25 is a plan view showing the lower electrode. The lower electrode is divided into two electrodes, that is, a first lower electrode 108 taking a circular shape and a second lower electrode 109 which is concentric with the first lower electrode 108 and takes an annular shape through an insulating portion 107 The first lower electrode 108 is connected to an electrode pad 120 and the second lower electrode 109 is connected to an electrode pad 121. FIG. 26 is a plan view showing the upper electrode. The upper electrode is also divided into the same shapes as those of the lower electrode, and is constituted by the first upper electrode 105, the second upper electrode 106 and the insulating portion 107. The first upper electrode 105 and the second upper electrode 106 are wired to electrode pads 125 and 126, respectively. In each of the upper electrode and the lower electrode, the second electrode is partially provided with a portion in which an electrode is not arranged, and the wire led from the first electrode is provided through the portion in which the electrode is not arranged, and the second electrode is annular and almost C-shaped.

Next, description will be given to an example in which the structure is fabricated. First of all, the elastic unit 104, the first lower electrode 108 and the second lower electrode 109 are formed over the whole plate-shaped substrate 116, and the piezoelectric unit 103 is formed thereon, the first upper electrode 105 and the second upper electrode 106 are formed on the piezoelectric unit 103, and the elastic unit 104 is provided thereon. Then, patterning is carried out over an opposite surface to the surface of the substrate 116 provided with the laminated film by using photolithography, and dry etching or wet etching is carried out to perform a processing until the elastic unit 104 on the substrate 116 side is uncovered. Thereafter, the reflective film 129 is formed on the elastic unit 104 from the side on which the etching is carried out.

As another method, moreover, the etching is stopped before the elastic unit 104 is uncovered, and a part of the substrate 116 is left in an etching portion in the process. Since a part of the substrate 116 is formed very thinly, a displacement can easily be carried out. In the same manner as described above, the reflective film 129 is formed in a portion in which the substrate 116 is thinned.

As a further method, it is also possible to form the laminated film on another substrate, and furthermore, to form a through hole or a concave portion to be the cavity portion 133 on the substrate 116, and to then push another substrate against the substrate 116, thereby transferring the laminated film to cover the cavity portion 133 of the substrate 116.

In the embodiment, the cavity portion 133 has such a structure that a sectional area is larger on an opposite side to a side on which the laminated film is provided, and the laminated film side has a smaller sectional area. Consequently, a light can be efficiently led to the reflective film 129. Depending on a specification, the cavity portion 133 may be constituted with an equal sectional area, or the sectional area on the laminated film side may be large and the sectional area on the opposite side may be small. In the embodiment, the section of the cavity portion 133 takes a circular shape. For this reason, there is employed a structure in which the diameter of the section on the laminated film side is small and the diameter of the section on the opposite side thereto is large.

Figure 27:
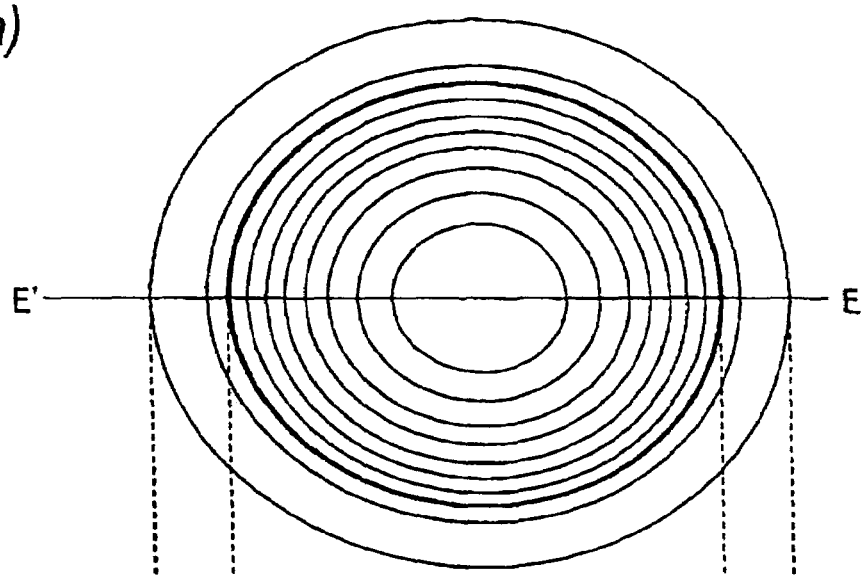
FIG. 27 is a diagram showing the contour line of the displacement of the aberration correcting mirror according to the invention and is a chart showing the displacement.
Figure 27:
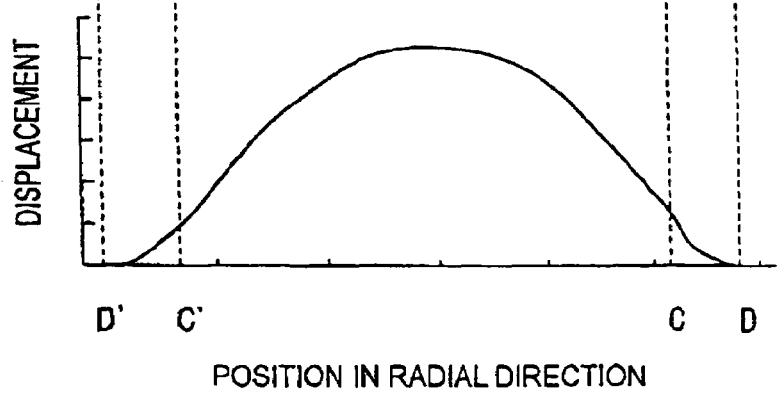

FIG. 27 shows the case in which the first upper electrode 105 and the second lower electrode 109 are grounded and a voltage V is applied to the second upper electrode 106 and the first lower electrode 108 in the structure described above, (a) illustrating the contour line of the displacement of a reflective film and (b) illustrating the displacement. In the drawings, C, C' and D, D' correspond to the positions of the circumferences of the insulating portion and the cavity portion, respectively. The positions of D, D' indicate the cavity circumference, in which the displacement is constrained. Consequently, the displacement is zero. The displacement is downward convexed in an annular portion corresponding to C-D and C'-D', and is upward convexed in a portion corresponding to the diameter of C-C' with the boundary of C and C'. Thus, the reason why the sign of a curvature is reversed with an electrode dividing position to be a boundary has been described above. Although a spherical shape is generally required for correcting a spherical aberration, a curved shape on C-C' is spherical. In the invention, accordingly, a curved portion on C-C', that is, a portion of the reflective film corresponding to the shape of the first electrode or an inside thereof is used. Consequently, it is possible to implement an aberration correction with very high precision.

Figure 28:
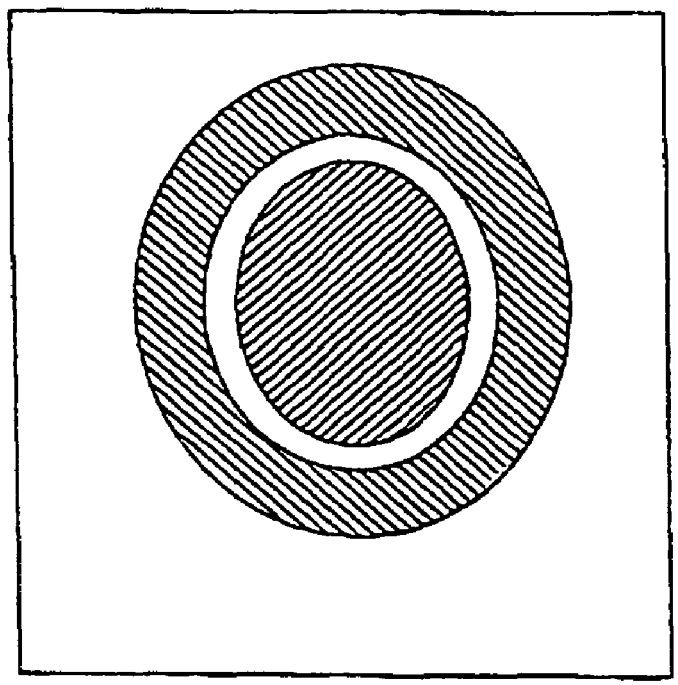
FIG. 28 is a plan view showing an upper electrode and a cavity portion in another configuration of the invention.
Figure 28:
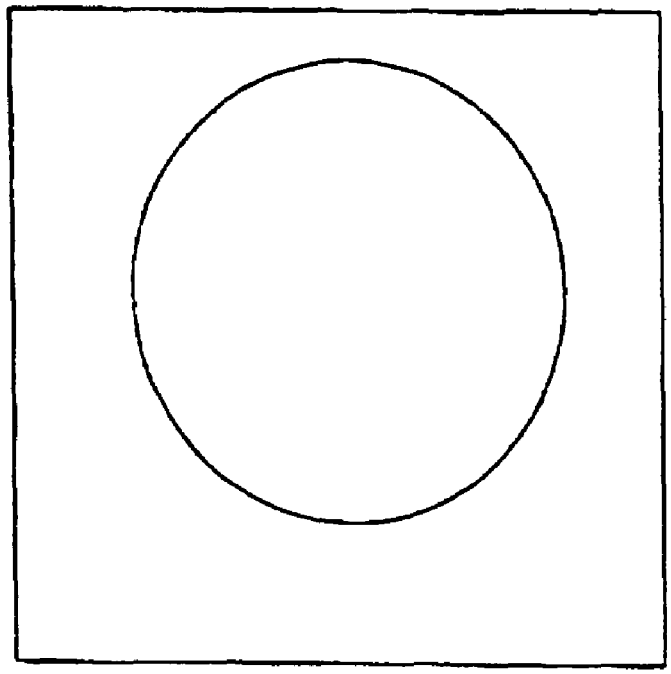
Figure 29:
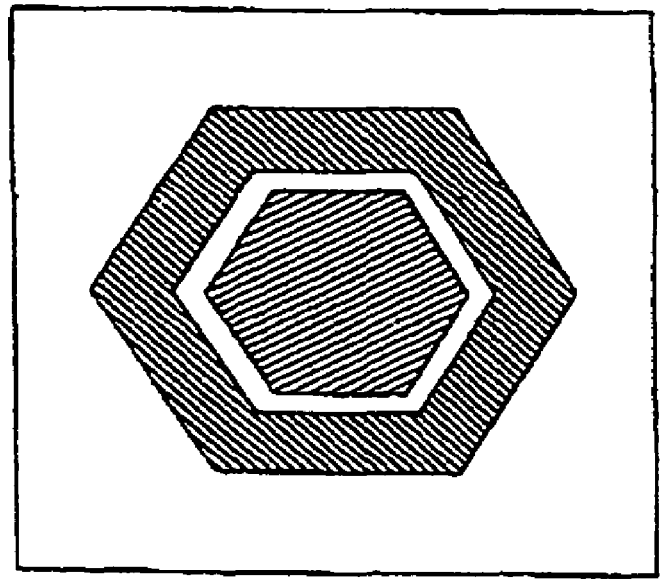
FIG. 29 is a plan view showing an upper electrode and a cavity portion in yet another configuration of the invention.
Figure 29:
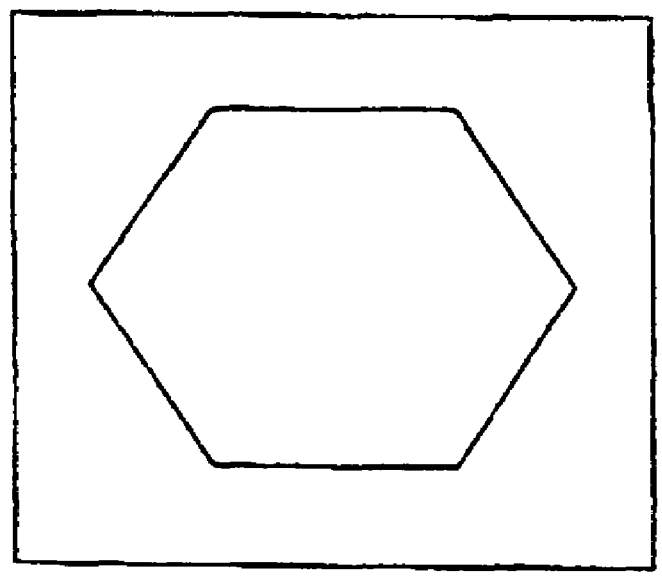
Figure 30:
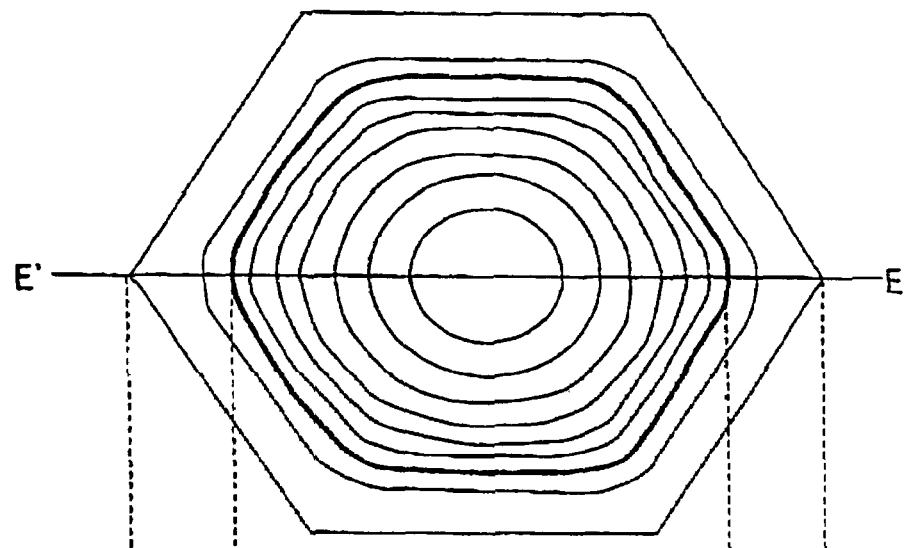
FIG. 30 is a diagram showing the displacement of the aberration correcting mirror according to the invention.
Figure 30:
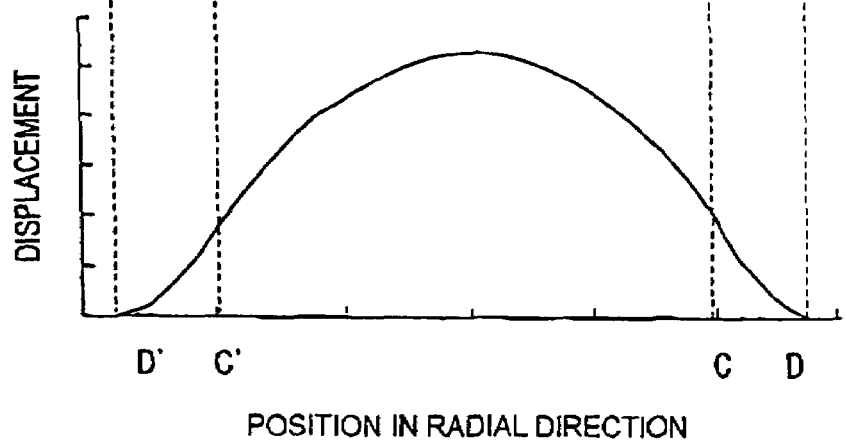

FIG. 28 shows an example of the shapes of the upper electrode and the cavity portion 133 in the aberration correcting mirror which is preferably applied to the case in which a light beam is obliquely incident on an aberration mirror (a lead electrode and a wired electrode are not shown). The upper electrode (FIG. 28(a)) and the cavity portion 133 (FIG. 28(b)) take concentric elliptical shapes. By this structure, s spherical aberration can be corrected effectively for the oblique incident light. The lower electrode takes the same shape as the shape of the upper electrode (the shape of an electrode will be described below by using only the upper electrode). The shapes of the first electrode and the cavity portion do not need to be (elliptical) circular if they are symmetrical about an optical axis. For example, the shape may be a regular hexagon as shown in FIG. 29. FIGS. 29(a) and (b) show the upper electrode and the cavity portion, respectively (a lead electrode and a wired electrode are not shown). FIG. 30 shows a contour line for a displacement in the structure of FIG. 29 and is a graph showing a displacement amount in an E-E' section. In each section taken along a central axis, the displacement takes a shape expressed in secondary and higher-order even terms. C and C' indicate places corresponding to a dividing position for insulating the first electrode and the second electrode. Moreover, D and D' indicate places corresponding to the circumference of the cavity portion 233. It is apparent that the contour line of the whole displacement reflects the shape of the regular hexagon in the peripheral part of the cavity portion and converges on a circle toward a center. According to the invention, the inner part of the first electrode is used as a mirror portion. Even if the shape of the electrode is a hexagon, therefore, a spherical aberration can be corrected well.

Thus, the shapes of the first electrode and the cavity may be regular polygons. Moreover, the first electrode and the cavity do not need to take the same shape if they are symmetrical about a central axis. For example, even if the shape of the first electrode is a circle and the shape of the cavity is a regular hexagon, it is possible to obtain the same advantages according to the invention.

Since the displacement is constrained by the circumference of the cavity portion, the shape of the second electrode does not play an essentially important part. If the second electrode takes at least the same shape as the shape of the cavity portion or such a shape as to completely include the cavity portion, accordingly, the advantages of the invention can be prevented from being reduced.

Figure 31:
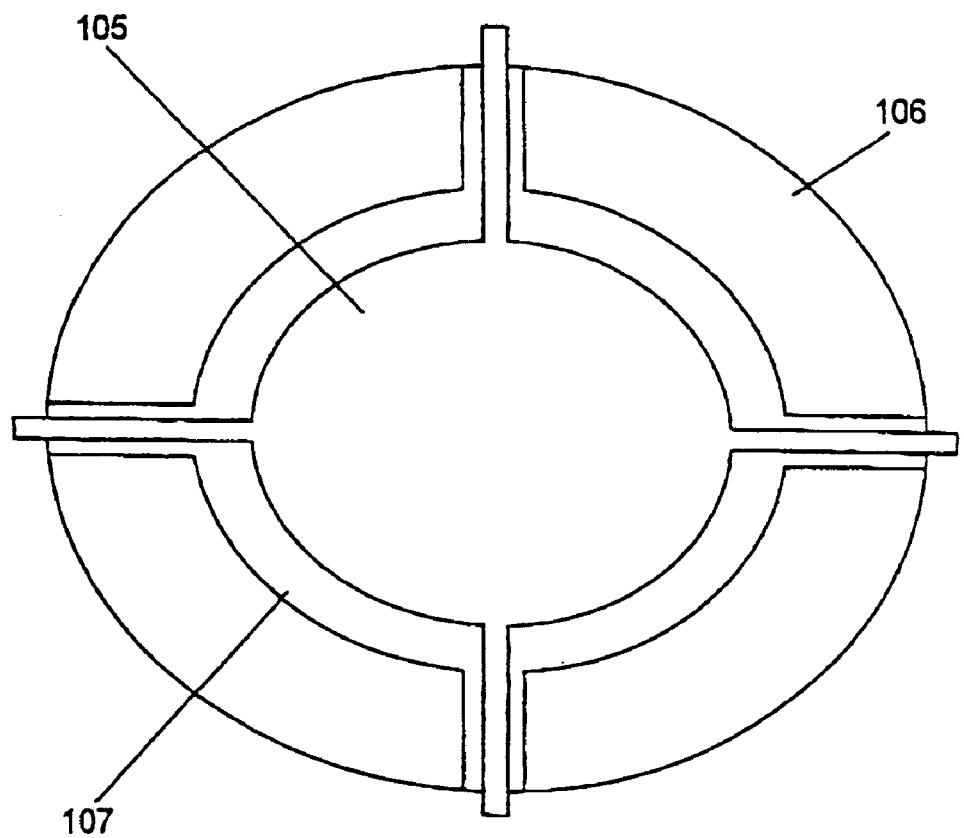
FIG. 31 is a plan view showing an upper electrode in a further configuration of the invention.
Figure 32:
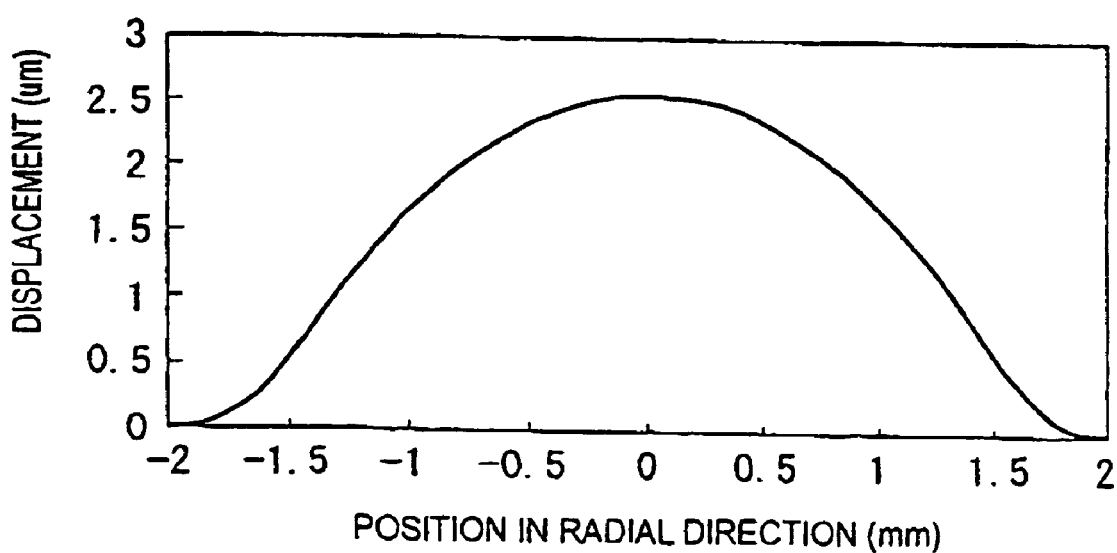
FIG. 32 is a chart showing a displacement according to an example of the invention.
Figure 33:
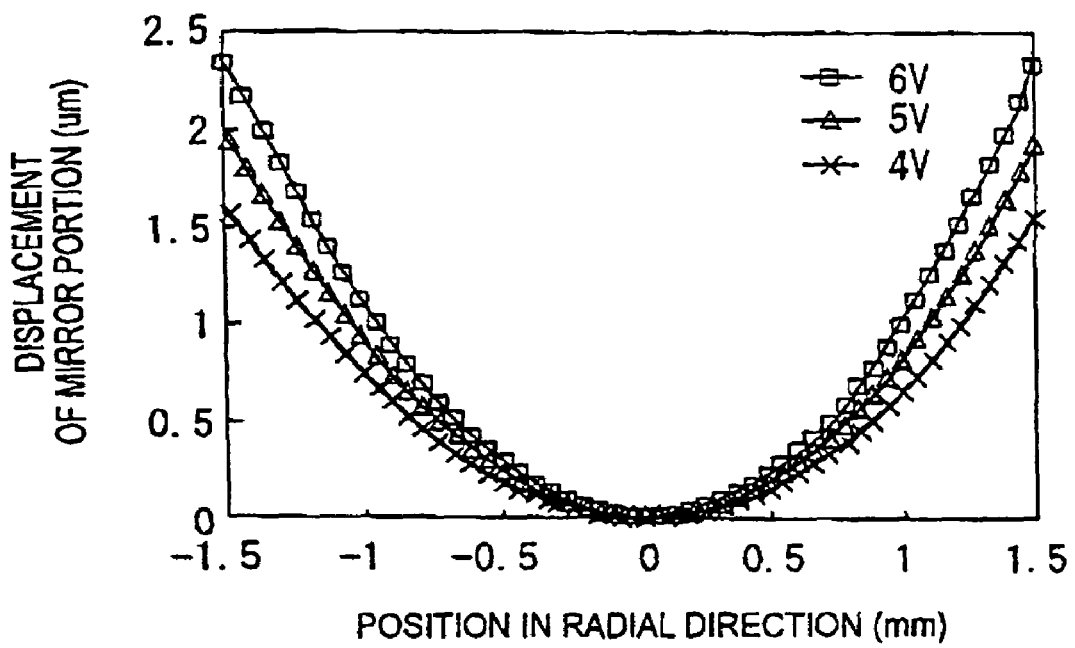
FIG. 33 is a chart showing the displacement of a mirror portion according to the example of the invention.

Any number of wiring portions from the first electrode to an electrode pad can be provided radially from the central axis. In FIG. 31, four wiring portions are provided to have a four-time symmetry about the central axis (the wired line is not shown). It is also possible to lead eight wiring portions with an eight-time symmetry. It is preferable that the number of lead wires which are provided to enhance a symmetry should be as small as possible. Moreover, the wired line is provided on the outside of the cavity portion. Therefore, any geometrical shape can produce the advantages of the invention.

Description will be given to an example in which a calculation is carried out by using a general purpose analytical software ANSYS. A cavity was set to be a circle having a radius of 2 mm and a cylinder having a thickness of 10.7 μm on a cavity portion was set to be an analytic region. For a layer structure, $SiO_2$ (elastic unit): 1 μm, Ti (lower electrode): 0.2 μm, PZT (piezoelectric unit): 3 μm, Cr (upper electrode): 0.5 μm, SiO$_2$ (elastic unit): 1 μm, and Ni (elastic unit): 5 μm were provided in an ascending order. Each of the upper electrode and the lower electrode is divided into a first electrode and a second electrode through an annular insulating portion having a thickness of 20 μm. The first electrode was set to be a circle (cylinder) which is concentric with the cavity portion and has a radius of 1.49 mm and the second electrode was set to take an annular (cylindrical) shape having an inside radius of 1.51 mm and an outside radius of 2.0 mm. 0V was applied to the first upper electrode 105, 10V was applied to the first lower electrode 108, 10V was applied to the second upper electrode 6 and 0V was applied to the second lower electrode 9 to carry out a piezoelectric analysis. As a result, a displacement shown in FIG. 12 was obtained. FIG. 12 shows a displacement amount in a certain section taken along a central axis in the whole cavity portion 33. It is apparent that a spherical shape is obtained in the first electrode, that is, within a range of −1.49 to +1.49. FIG. 13 is a graph obtained by plotting the absolute value of a displacement with a maximum displaced portion (center) set to be an origin based on displacement data when potential differences of 4V, 5V and 6V are applied in the same structure, showing the shape and amount of a displacement for only the mirror portion (the reflective film 129). By changing the potential difference, thus, it is possible to obtain spherical shapes having different shape factors.

Figure 34:
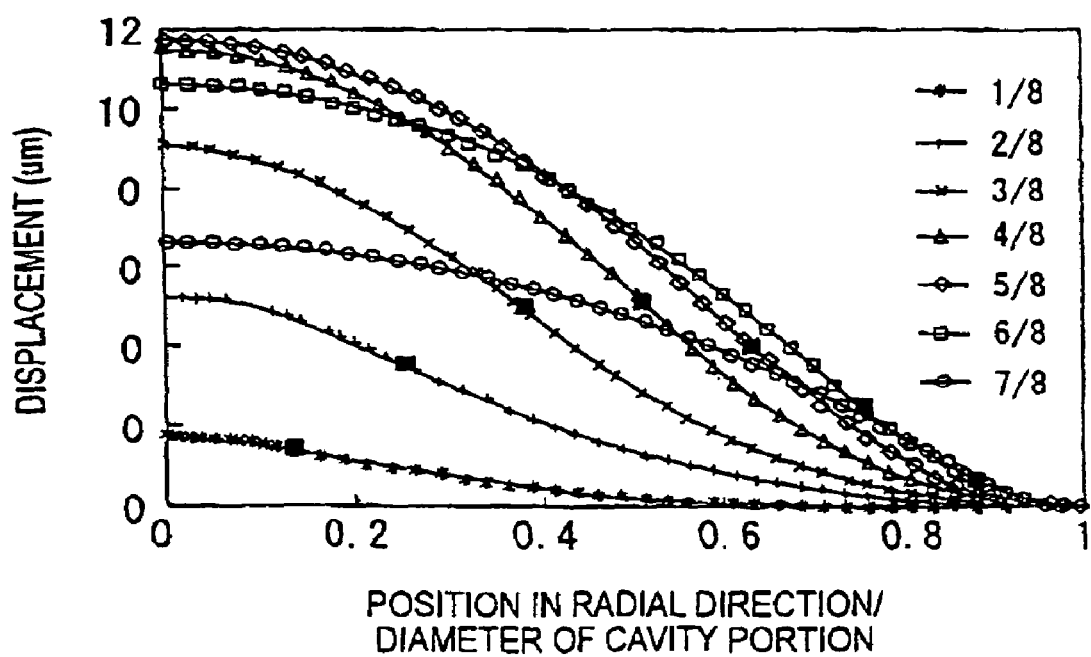
FIG. 34 is a chart showing a displacement according to the example of the invention.
Figure 35:
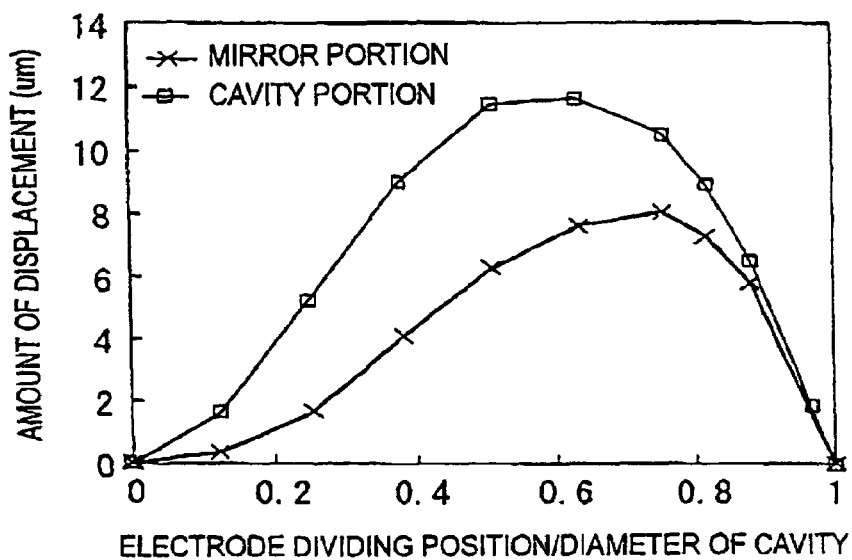
FIG. 35 is a chart showing the maximum displacement amount of the aberration correcting mirror according to the invention.

Furthermore, FIG. 34 is a chart showing a displacement in a radial direction of the whole cavity portion 133 in the case in which a dividing position in the radial direction of the cavity portion 133 of the upper electrode is varied to be ⅛, ⅔, ⅜, ⅘, ⅝, ⅚ and ⅞ with respect to the radius of the cavity in the same structure. The position is standardized with the radius of the cavity. ■ indicates an electrode dividing position. Thus, it is possible to change the amount of a displacement and the shape of a deformation by varying the electrode dividing position. FIG. 35 shows a relationship between maximum displacement amounts in the cavity portion and the mirror portion for the electrode dividing position, respectively. Consequently, it was found that the displacement amount of the mirror portion (the reflective film 129) is a maximum in the vicinity of a dividing ratio of r/R=0.75. r and R represent a mirror radius and a cavity radius, respectively. More specifically, it was found that a large amount of the deformation can be obtained particularly efficiently with the electrode dividing ratio r/R of 0.7 to 0.8. On the other hand, in consideration of the case in which the mirror portion (the reflective film 129) is fabricated through a semiconductor process and is cut out of a wafer, the number of dies of the mirror is more increased with the dividing ratio r/R approximating to 1 and a cost is thereby reduced when the mirror diameter is decided. In order to optimize the deformation efficiency and cost of the mirror, accordingly, it is preferable that the electrode dividing ratio r/R should be equal to or higher than approximately 0.7 and should be lower than approximately 1. Moreover, the same analysis is carried out with a cavity diameter of 1.5 mm and 1 mm so that the same results as those in FIG. 35 are obtained. With the hexagonal cavity and electrode shown in FIG. 29, furthermore, if the dividing ratio r/R is defined for a hexagonal circumcircle, similarly, the maximum value of the displacement amount of the mirror portion is obtained within a range of 0.7 to 0.8. From the foregoing, it is possible to provide an inexpensive aberration correcting mirror which is the most efficient in an almost optional shape and size by setting the ratio of the mirror diameter to the cavity diameter to be equal to or higher than 0.7 and lower than 1.

The suitable examples have simply been described above. A dynamic spherical aberration can be corrected effectively by utilizing any practical piezoelectric and elastic units 103 and 104 if the invention is used. For example, it is possible to use, for the piezoelectric unit 3, a rock crystal, LiLiNbO$_3$, LiTaO$_3$, KNbO$_3$, ZnO, AlN, Pb(Zr, Ti)O$_3$ and PVDF (polyvinylidene fluoride) including PZT (zircon titanate). By using Ni, Ti, Cu, Cr, Au, Pt or a metal as the elastic unit 104, and furthermore, causing the first electrode and the cavity portion 133 to take any shape having a certain symmetry about a central axis, it is possible to effectively correct a spherical aberration. If the second electrode takes the same shape as that of the cavity portion 133 or such a shape as to include the cavity portion 133, the shape is entirely optional within a range in which a wiring is formed. Moreover, it is apparent that just the same advantages can be obtained even if the upper electrode is set to be a common electrode and the lower electrode is divided. Furthermore, both the upper electrode and the lower electrode may be divided.

While the optical pick-up has been described in the embodiment, it is a matter of course that the invention can also be applied to other optical devices.

As described above, according to the invention, it is possible to carry out a spherical aberration correction which is very small-sized and has power saving, an excellent responsiveness and high precision. Consequently, it is possible to utilize the invention for an optical pick-up to be used in a CD/DVD drive recorder, a decoder and a CD/DVD drive, particularly, an optical pick-up using a blue laser and an optical device requiring to correct an aberration.

Another configuration according to the invention is characterized in that the cavity portion is circular. By this structure, particularly, it is possible to obtain an advantage that a spherical aberration is effectively corrected when a beam is vertically incident on the mirror.

Yet another configuration according to the invention is characterized in that the shape of the first electrode is circular. By this structure, particularly, it is possible to obtain an advantage that a spherical aberration is effectively corrected when a beam is vertically incident on the mirror.

A further configuration according to the invention is characterized in that the cavity portion and the shape of the first electrode are concentric with each other. By this structure, it is possible to obtain an advantage that precision in a spherical aberration correction can be particularly enhanced.

A further configuration according to the invention is characterized in that a ratio r/R of an outside diameter r of the first electrode to an outside diameter R of the second electrode is equal to or higher than 0.7 and is lower than 1. By setting the ratio r/R to be approximately 0.75, it is possible to produce an advantage that a maximum amount of a displacement can be obtained when a voltage having a certain magnitude is applied irrespective of the outside diameter of a device. When the ratio r/R approximates to 1, moreover, the size of the whole device is reduced for a certain mirror diameter which is required. Consequently, it is possible to obtain an advantage that the number of dies can be increased and a cost can be reduced.

A further configuration according to the invention is characterized in that the initial shape of the mirror is schematically planar. Consequently, it is not necessary to initially take the shape of the mirror. Thus, it is possible to obtain an advantage that a manufacture can easily be carried out.

A further configuration according to the invention is characterized in that a lead wire from the first electrode is symmetrical about an axis of the first electrode. By this structure, the lead wire does not break the symmetry of the shape of the mirror. Thus, it is possible to carry out an effective spherical aberration correction.

A further configuration according to the invention is characterized in that the piezoelectric unit is a thin film. Consequently, it is possible to obtain an advantage that a lower voltage than that in a bulk is enough in order to obtain a piezoelectric distortion having a proper magnitude. In particular, it is possible to produce an advantage that a necessary amount of a deformation can be obtained from several to several tens volts.

A further configuration according to the invention is characterized in that only the first electrode of the piezoelectric device which is deformed is used as the mirror. Consequently, it is possible to selectively use only a portion taking the spherical shape. Thus, it is possible to carry out an optimum spherical aberration correction.

By the above structure, a reflecting plane can be deformed with high precision. Consequently, it is possible to reduce an aberration, particularly, a spherical aberration. In the case in which the reflecting plane is used as an optical pick-up, it is possible to enhance recording and reproducing characteristics.

It is possible to implement by combining the first embodiment and the second embodiment.

This application is based upon and claims the benefit of priority of Japanese Patent Application No2003-312458 filed on Sep. 4, 2003 and Japanese Patent Application No2003-325837 filed on Sep. 18, 2003, the contents of which are incorporated herein by references in its entirety.

What is claimed is:

1. An optical pick-up aberration correcting mirror, comprising:
   a substrate, having a cavity portion;
   a piezoelectric unit, provided opposite to the cavity portion;
   a pair of electrode films, interposing the piezoelectric unit therebetween, an elastic unit, provided opposite to the cavity portion; and
   an optical reflective film, provided opposite to the cavity portion;
   wherein each of the pair of electrode films is divided into at least two parts having a first electrode and a second electrode, the second electrode being provided to surround the first electrode, and such an electric potential as to set directions of electric fields in the piezoelectric unit to be reverse to each other is applied between the first electrode and the second electrode.

2. The optical pick-up aberration correcting mirror according to claim 1, wherein the cavity portion takes a circular shape.

3. The optical pick-up aberration correcting mirror according to claim 1, wherein the first electrode takes a circular shape.

4. The optical pick-up aberration correcting mirror according to claim 1, wherein the cavity portion and the first electrode are concentric with each other.

5. The optical pick-up aberration correcting mirror according to claim 1, wherein a ratio r/R of an outside diameter r of the first electrode to an outside diameter R of the second electrode is equal to or higher than 0.7 and is lower than 1.

6. The optical pick-up aberration correcting mirror according to claim 1, wherein an initial shape of the mirror is schematically planar.

7. The optical pickup aberration correcting mirror according to claim 1, wherein a lead wire from the first electrode is symmetrical about an axis of the first electrode.

8. The optical pick-up aberration correcting mirror according to claim 1, wherein the piezoelectric unit is a thin film.

9. The optical pickup aberration correcting mirror according to claim 1, wherein a portion corresponding to the first electrode or an inside thereof is utilized as a mirror in the reflective film.

10. The optical pick-up aberration correcting mirror according to claim 1, wherein the cavity portion is schematically symmetrical about an optical axis.

11. The optical pick-up aberration correcting mirror according to claim 1, wherein the first electrode is schematically symmetrical about an optical axis.

12. An aberration correcting mirror for an optical device comprising;
    a substrate, having a cavity portion;
    a piezoelectric unit, provided opposite to the cavity portion;
    a pair of electrode films, interposing the piezoelectric unit therebetween; an elastic unit, provided opposite to the cavity portion; and
    an optical reflective film, provided opposite to the cavity portion;
    wherein each of the pair of electrode films is divided into at least two parts having a first electrode and a second electrode, the second electrode being provided to surround the first electrode, and such an electric potential as to set directions of electric fields in the piezoelectric unit to be reverse to each other is applied between the first electrode and the second electrode.

13. An optical pick-up, comprising:
    a light source that emits a light;
    an optical pick-up aberration correcting mirror that reflects the light emitted from said light source to an optical disk; and
    a light receiver that receives a reflected light from the optical disk;
    said optical pickup aberration correcting mirror including:
    a substrate having a cavity portion,
    a piezoelectric unit, provided opposite to the cavity portion,
    a pair of electrode films, interposing the piezoelectric unit therebetween,
    an elastic unit, provided opposite to the cavity portion, and
    an optical reflective film, provided opposite to the cavity portion,
    wherein each of the pair of electrode films is divided into at least two parts having a first electrode and a second electrode, the second electrode being provided to surround the first electrode, and such an electric potential as to set directions of electric fields in the piezoelectric unit to be reverse to each other is applied between the first electrode and the second electrode.

14. An optical pick-up, comprising:
    a light source that emits a light to an optical disk;
    an optical pickup aberration correcting mirror that reflects a reflected light from the optical disk; and
    a light receiver that receives a reflected light from said optical pickup aberration correction mirror;

said optical pick-up aberration correcting mirror including:
a substrate having a cavity portion,
a piezoelectric unit, provided opposite to the cavity portion,
a pair of electrode films, interposing the piezoelectric unit therebetween,
an elastic unit, provided opposite to the cavity portion, and
an optical reflective film, provided opposite to the cavity portion, wherein each of the pair of electrode films is divided into at least two parts having a first electrode and a second electrode, the second electrode being provided to surround the first electrode, and such an electric potential as to set directions of electric fields in the piezoelectric unit to be reverse to each other is applied between the first electrode and the second electrode.

* * * * *